United States Patent
Huang et al.

(10) Patent No.: US 11,951,637 B2
(45) Date of Patent: Apr. 9, 2024

(54) CALIBRATION APPARATUS AND CALIBRATION METHOD FOR COORDINATE SYSTEM OF ROBOTIC ARM

(71) Applicant: Delta Electronics, Inc., Taoyuan (TW)

(72) Inventors: Cheng-Hao Huang, Taoyuan (TW); Shi-Yu Wang, Taoyuan (TW); Po-Chiao Huang, Taoyuan (TW); Han-Ching Lin, Taoyuan (TW); Meng-Zong Li, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 194 days.

(21) Appl. No.: 17/339,760

(22) Filed: Jun. 4, 2021

(65) Prior Publication Data

US 2022/0097234 A1 Mar. 31, 2022

(30) Foreign Application Priority Data

Sep. 29, 2020 (CN) .......................... 202011046310.9

(51) Int. Cl.
*B25J 9/16* (2006.01)
*B25J 9/02* (2006.01)
(Continued)

(52) U.S. Cl.
CPC .............. *B25J 9/1692* (2013.01); *B25J 9/023* (2013.01); *B25J 9/1607* (2013.01); *B25J 9/1664* (2013.01); *B25J 9/1697* (2013.01); *B25J 13/088* (2013.01)

(58) Field of Classification Search
CPC ........ B25J 9/1692; B25J 9/023; B25J 9/1607; B25J 9/1664; B25J 9/1697; B25J 13/088;
(Continued)

(56) References Cited

U.S. PATENT DOCUMENTS

2012/0123590 A1* 5/2012 Halsmer ................ B25J 9/1656
901/3
2016/0279800 A1* 9/2016 Onda ..................... B25J 9/1692
(Continued)

FOREIGN PATENT DOCUMENTS

EP 3711908 A1 * 9/2020 .......... B25J 19/0095
JP 2014161950 A * 9/2014
(Continued)

*Primary Examiner* — Adam R Mott
*Assistant Examiner* — Byron Xavier Kasper
(74) *Attorney, Agent, or Firm* — Chun-Ming Shih; HDLS IPR SERVICES

(57) ABSTRACT

A calibration apparatus includes a processor, an alignment device, and an arm. The alignment device captures images in a three-dimensional space, and a tool is arranged on a flange of the arm. The processor records a first matrix of transformation between an end-effector coordinate-system and a robot coordinate-system, and performs a tool calibration procedure according to the images captured by the alignment device for obtaining a second matrix of transformation between a tool coordinate-system and the end-effector coordinate-system. The processor calculates relative position of a tool center point of the tool in the robot coordinate-system based on the first and second matrixes, and controls the TCP to move in the three-dimensional space for performing a positioning procedure so as to regard points in an alignment device coordinate-system as points of the TCP, and calculates the relative positions of points in the alignment device coordinate-system and in the robot coordinate-system.

15 Claims, 16 Drawing Sheets

(51) Int. Cl.
*B25J 13/08* (2006.01)
*G01B 11/00* (2006.01)

(58) Field of Classification Search
CPC ..... B25J 9/00; B25J 9/0084; B25J 9/06; B25J 9/1602; B25J 9/1656; G01B 11/002; G05B 2219/39007; G05B 2219/39022; G05B 2219/39025
See application file for complete search history.

(56) References Cited

U.S. PATENT DOCUMENTS

| | | | |
|---|---|---|---|
| 2016/0288332 A1* | 10/2016 | Motoyoshi | B25J 13/085 |
| 2018/0304467 A1* | 10/2018 | Matsuura | B25J 13/06 |
| 2019/0381659 A1* | 12/2019 | Mönnich | B25J 9/1643 |
| 2020/0143564 A1* | 5/2020 | Ross | G06T 7/75 |
| 2020/0198145 A1* | 6/2020 | Hsu | B25J 9/1697 |
| 2021/0299876 A1* | 9/2021 | Vepakomma | B25J 9/1692 |

FOREIGN PATENT DOCUMENTS

| | | | |
|---|---|---|---|
| JP | 2015147280 A | * | 8/2015 |
| WO | WO-2020010627 A1 | * | 1/2020 |

* cited by examiner (1)

(2)

(3)

(4)

(5)

(6)

(7)

CALIBRATION APPARATUS AND CALIBRATION METHOD FOR COORDINATE SYSTEM OF ROBOTIC ARM

BACKGROUND OF THE INVENTION

1. Technical Field

The technical field relates to a robotic arm, and specifically relates to a calibration apparatus and a calibration method for calibrating a coordinate system of the robotic arm.

2. Description of Related Art

For ensuring that a robotic arm can work on the precise position, the operator of the robotic arm needs to calibrate the robotic arm as well as a tool arranged thereon after the tool is assembled, or is using for a long period, or is changed, etc. Especially, the coordinates of a tool center point (TCP) of the tool need to be calibrated.

Common styles of calibration apparatus in the market use infrared emitter to emit infrared light to a closed area, and control the robotic arm to move, via the TCP of the tool arranged on the robotic arm, in the closed area for blocking the infrared light, so as to perform a point teaching action of the TCP and then creates a tool pattern of the tool.

After the tool is used for a pre-determined period, or after the tool is changed, the calibration apparatus needs to measure the TCP of the tool (i.e., the used tool or the newly changed tool) again through the above action, so as to obtain the deviation between the current TCP and the previous TCP. When the operator controls the robotic arm, the robotic arm can compensate the current TCP of the tool on the robotic arm through the previously created tool pattern and the measured deviation, so as to implement the calibration procedure to the tool.

However, the above calibration procedure of current calibration apparatus may only measure and calculate the relative deviation between the current TCP of the tool and the previous TCP of the tool (i.e., the tool pattern previously created), but the dimension of the tool is not obtained, which causes inconveniences in controlling the robotic arm.

Moreover, the above calibration apparatus may only be used to calibrate the TCP of the tool, but not establish transforming relationships among multiple robotic arms. In other words, the above calibration apparatus may not be able to provide effective help under an environment which multiple robotic arms are working together.

SUMMARY OF THE INVENTION

The disclosure is directed to a calibration apparatus and a calibration method for a coordinate system of a robotic arm. The disclosure may create transforming matrixes for computing the relative positions of the points in the alignment device coordinate system and in the robot coordinate system, thus performs necessary calibration actions accordingly.

In one of the exemplary embodiments, the calibration apparatus of this disclosure includes an alignment device using an alignment device coordinate system, a robotic arm using a robot coordinate system, a tool using a tool coordinate system, and a processor electrically connected with the alignment device and the robotic arm, wherein:

the alignment device is used to capture an image in a field of view (FoV), wherein the FoV is a three-dimensional space;

a flange is arranged on one end of the robotic, one end of the tool is arranged on the flange, and the other end of the tool has a tool center point (TCP);

the processor records a first homogeneous matrix indicating a transforming relationship between the end-effector coordinate system and the robot coordinate system, wherein the processor is configured to control the tool to move in the three-dimensional space under different gestures for performing a tool calibration procedure, and to compute a second homogeneous matrix indicating a transforming relationship between the tool coordinate system and the end-effector coordinate system according to data obtained from the tool calibration procedure;

wherein, the processor is configured to compute a third homogeneous matrix indicating a transforming relationship between the tool coordinate system and the robot coordinate system according to the first homogeneous matrix and the second homogeneous matrix, and to compute a relative position of the TCP on the robot coordinate system based on the third homogeneous matrix;

wherein, the processor is configured to control the TCP to perform a three-point fix procedure in the three-dimensional space for regarding points in the alignment device coordinate system as points of the TCP, to compute a fourth homogeneous matrix indicating a transforming relationship between the alignment device coordinate system and the robot coordinate system based on the third homogeneous matrix, and to compute relative positions of points in the alignment device coordinate system and in the robot coordinate system according to the fourth homogeneous matrix.

In another one of the exemplary embodiments, the calibration method of this disclosure is incorporated with a calibration apparatus having an alignment device, a robotic arm having a flange on one end thereof, a tool arranged on the flange having a tool center point (TCP), and a processor electrically connected with the alignment device and the robotic arm, wherein the robotic arm uses a robot coordinate system, the flange uses an end-effector coordinate system, the tool uses a tool coordinate system, the alignment device uses an alignment device coordinate system, and the calibration method includes:

a) controlling the alignment device to capture an image in a Field of view (FoV), wherein the FoV is a three-dimensional space;

b) controlling the tool to move in the three-dimensional space under different gestures for performing a tool calibration procedure by the processor, wherein the processor records a first homogeneous matrix indicating a transforming relationship between the end-effector coordinate system and the robot coordinate system;

c) computing a second homogeneous matrix indicating a transforming relationship between the tool coordinate system and the end-effector coordinate system based on data obtained from the tool calibration procedure;

d) computing a third homogeneous matrix indicating a transforming relationship between the tool coordinate system and the robot coordinate system based on the first homogeneous matrix and the second homogeneous matrix, and computing a relative position of the TCP in the robot coordinate system according to the third homogeneous matrix;

e) controlling the TCP to perform a three-point fix procedure in the three-dimensional space by the processor for regarding points in the alignment device coordinate system as points of the TCP;

f) computing a fourth homogeneous matrix indicating a transforming relationship between the alignment device coordinate system and the robot coordinate system based on the third homogeneous matrix; and g) computing relative positions of points in the alignment device coordinate system and in the robot coordinate system according to the fourth homogeneous matrix.

In comparison to the related art, this disclosure obtains the dimension of the tool through the alignment device, and precisely computes the relative positions of the tool center point in the robot coordinate system. Therefore, it is beneficial for the robotic arm in performing high precision tasks.

Besides, this disclosure obtains the relative positions of the points in the alignment device coordinate system and in the robot coordinate system through performing the calibration action, thus the alignment device may be used to calibrate multiple robotic arms and to establish coordinate transforming relationships among multiple robotic arms. Therefore, the multiple robotic arms may work based on same coordinate system, and a working environment for multiple robotic arms to work together may be precisely established.

DETAILED DESCRIPTION OF THE INVENTION

In cooperation with the attached drawings, the technical contents and detailed description of this disclosure are described thereinafter according to multiple embodiments, being not used to limit its executing scope. Any equivalent variation and modification made according to appended claims is all covered by the claims claimed by this disclosure.

Figure 1:
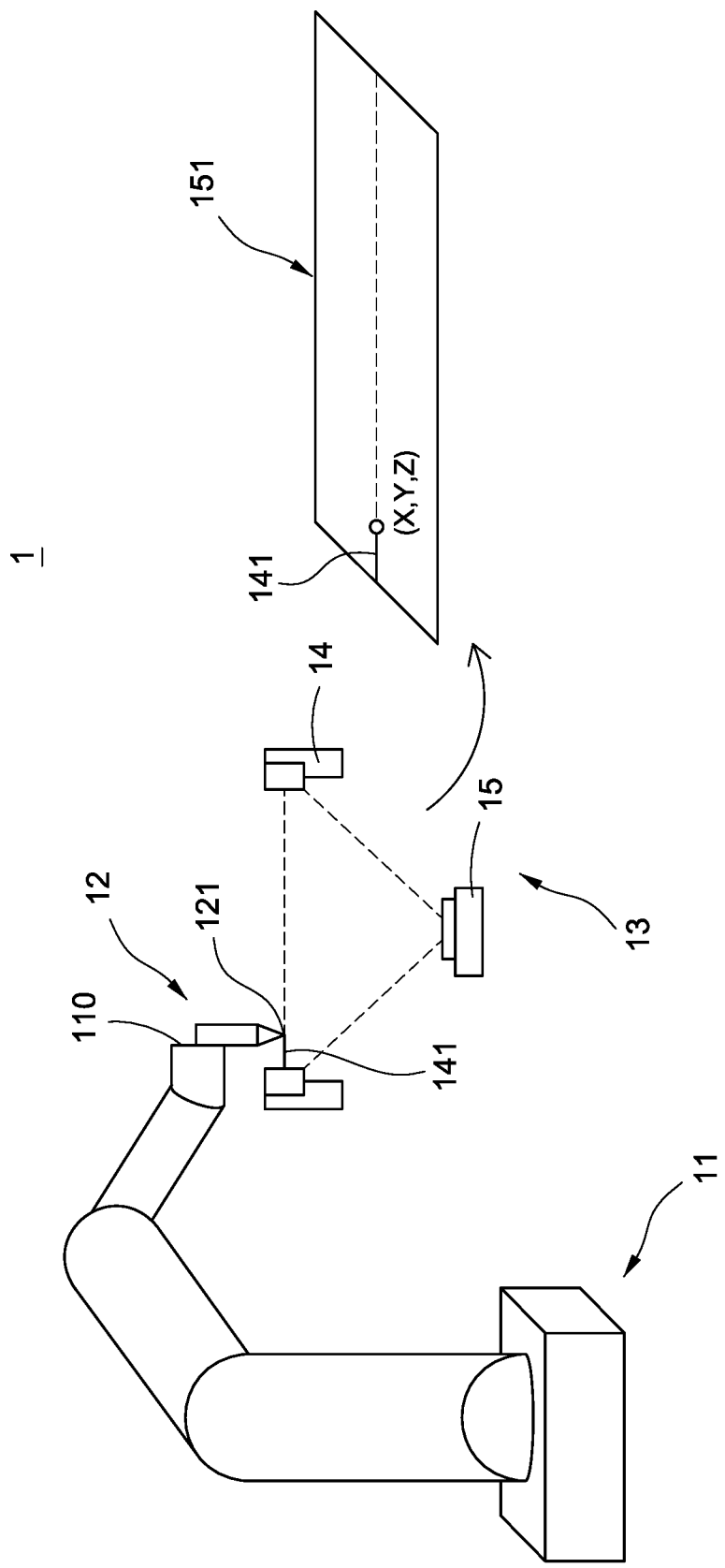
FIG. 1 is a schematic diagram of a calibration apparatus of a first embodiment according to this disclosure.
Figure 2:
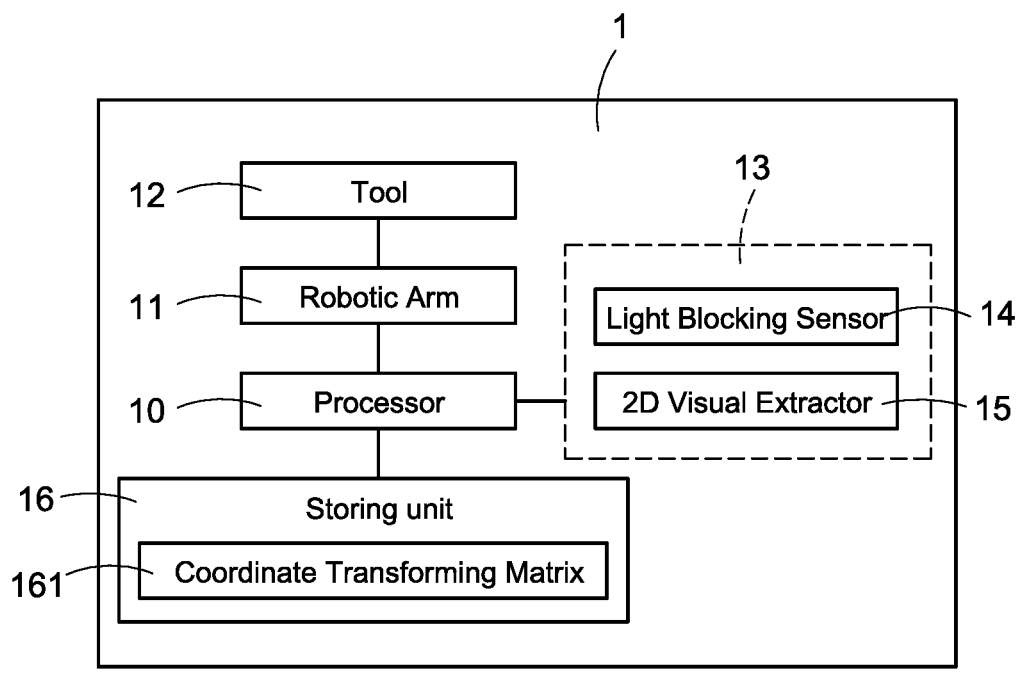
FIG. 2 is a block diagram of a calibration apparatus of a first embodiment according to this disclosure.

FIG. 1 is a schematic diagram of a calibration apparatus of a first embodiment according to this disclosure. FIG. 2 is a block diagram of a calibration apparatus of a first embodiment according to this disclosure.

As shown in FIG. 1 and FIG. 2, this disclosure discloses a calibration apparatus 1, the calibration apparatus 1 may be used to calibrate a coordinate system used by a robotic arm 11. In particular, different parts of the robotic arm 11 may respectively use different coordinate systems to perform positioning, and different robotic arms may also use different coordinate systems. The calibration apparatus 1 of this disclosure may perform alignment and calibration to different coordinate systems for eliminating the position deviations among them, so the robotic arm 11 may be trustworthy in performing high precision tasks.

As shown in FIG. 1 and FIG. 2, the calibration apparatus 1 may have a processor 10, the robotic arm 11 and an alignment device 13. The robotic arm 11 and the alignment device 13 are electrically connected with the processor 10, wherein the robotic arm 11 and the alignment device 13 are arranged individually.

One end of the robotic arm 11 is set on a platform, and the other end of the robotic arm 11 has a flange 110. The calibration apparatus 1 further has a tool 12, one end of the tool 12 is arranged on the flange 110 of the robotic arm 11, and the other end of the tool 12 is defined with a tool center point (TCP) 121. It should be mentioned that the processor 10 may be electrically connected with the tool 12 for the processor 10 to directly control the tool 12, or the processor 10 may control the tool 12 indirectly through the robotic arm 11.

In this disclosure, the alignment device 13 is used to capture images within its field of view (FoV). The form and the pattern of the alignment device 13 are not limited to the disclosure shown in FIG. 1 and FIG. 2. Besides, for calibrating the robotic arm 11, the alignment device 13 may obtain images in a three-dimensional space and perform an image analysis based on the images. In other words, the FoV of the alignment device 13 is a three-dimensional space.

In a first embodiment as shown in FIG. 1 and FIG. 2, the alignment device 13 at least includes a light blocking sensor 14 and a 2D visual extractor 15, wherein the light blocking sensor 14 and the 2D visual extractor 15 are arranged individually.

The 2D visual extractor 15 may be multiple types of image capturer, such as a camera, a light sensor, etc., which is used to capture 2D images 151 within a pre-defined FoV. When the robotic arm 11 drives the tool 12 to move and makes the TCP 121 of the tool 12 to enter the pre-defined FoV, the calibration apparatus 1 of this disclosure may capture a 2D image 151 including an image of the TCP 121 through the 2D visual extractor 15, and computes the captured 2D image 151 to obtain a two-dimensional coordinate (i.e., an X-axis coordinate and a Y-axis coordinate) of the TCP 121.

The light blocking sensor 14 is used to emit a light beam 141 propagating externally. In particular, the light blocking sensor 14 includes a light emitting part and a light receiving part correspondingly arranged with each other, the light emitting part is used to emit the light beam 141, and the light receiving part is used to receive the light beam 141. If the light beam 141 is not received by the light receiving part, the processor 10 may determine that the light beam 141 is blocked. In one of the exemplary embodiments, the 2D visual extractor 15 is arranged according to the position of the light blocking sensor 14, and the emitting position of the light beam 141 is located within the FoV of the 2D visual extractor 15. In this embodiment, the light beam 141 may be visible light or invisible light. If the light beam 141 is visible light, the 2D images 151 captured by the 2D visual extractor 15 include an image of the light beam 141 because the light beam 141 is emitted within the FoV of the 2D visual extractor 15.

If the light beam 141 is invisible light (for example, an infrared light), an image of the light beam 141 is not formed within the FoV of the 2D visual extractor 15. Here is not intended to be limiting.

It should be mentioned that the light blocking sensor 14 is arranged on a horizontal plane (for example, the light blocking sensor 14 and the robotic arm 11 are arranged on same horizontal platform), so the light beam 141 emitted by the light blocking sensor 14 may have a fixed height, which is known or unknown by the processor 10. When the robotic arm 11 drives the tool 12 to move and causes the TCP 121 of the tool 12 to block the light beam 141, the calibration apparatus 1 may set the current height of the TCP 121 (i.e., a Z-axis coordinate of the TCP 121) through a blocking signal generated and provided from the light blocking sensor 14. In particular, when the TCP 121 blocks the light beam 141, the Z-axis height of the TCP 121 is equal to the emitting height of the light beam 141.

As mentioned above, the X-axis coordinate and the Y-axis coordinate of the TCP 121 may be obtained through analyzing the captured 2D images 151, and the Z-axis coordinate of the TCP 121 may be obtained through the blocking signal generated and provided from the light blocking sensor 14. In a conclusion, the first embodiment of this disclosure may form the aforementioned three-dimensional space based on the light beam 141 and the 2D images 151. More specifically, through controlling the TCP 121 to block the light beam 141, the calibration apparatus 1 of this disclosure may obtain the coordinate information of the TCP 121 within the three-dimensional space, and use the coordinate information of the TCP 121 for performing the calibrating actions.

Figure 3:
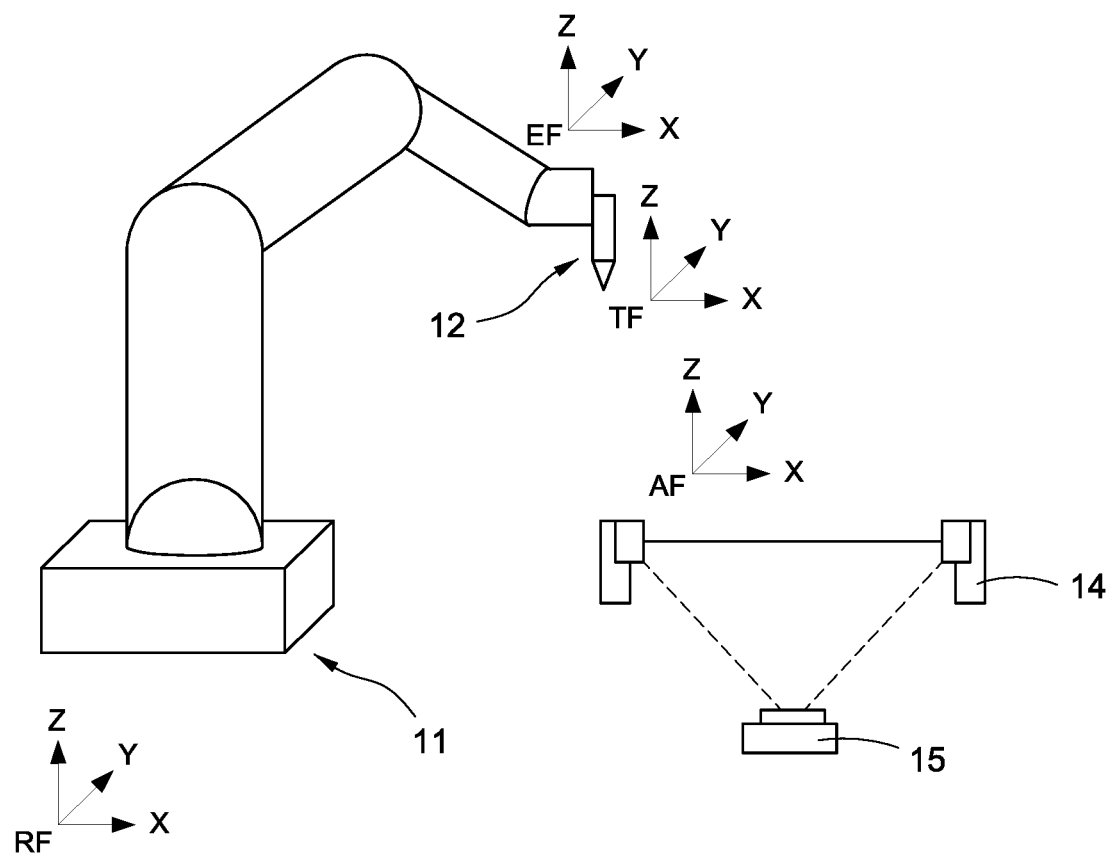
FIG. 3 is a schematic diagram showing a coordinate system of a calibration apparatus of a first embodiment according to this disclosure.

FIG. 3 is a schematic diagram showing a coordinate system of a calibration apparatus of a first embodiment according to this disclosure. As shown in FIG. 3, the robotic arm 11 uses a robot coordinate system RF, the flange uses an end-effector coordinate system EF, the tool 12 uses a tool coordinate system TF, and the alignment device 13 uses an alignment device coordinate system AF.

As disclosed above, different parts of the robotic arm 11 may respectively work based on different coordinate systems. The mechanism may be worn off after working for a long period, each part of the robotic arm 11 may generate critical position deviation, and the position deviations may then reduce the accuracy of the robotic arm 11. One of the technical features of this disclosure is to establish transforming relationships among each of the coordinate systems, then obtain the relative positions of each part (especially the TCP 121 and the alignment device 13) in the robot coordinate system RF through the transforming relationships. Therefore, the problem in the related art that the calibration apparatus may only obtain a relative deviation and inferior calibration effect can be solved.

As disclosed in FIG. 2, the calibration apparatus 1 further includes a storing unit 16 connected with the processor 10. The storing unit 16 may be embedded in the processor 10 or individually arranged out of the processor 10. The storing unit 16 may be a memory, a hard-drive, or a cloud storage, but not limited thereto.

The storing unit 16 stores a coordinate transforming matrix 161, the coordinate transforming matrix 161 records the transforming relationship among each element of the calibration apparatus 1. In this disclosure, such transforming relationship is recorded by way of homogeneous transformation matrix, but not limited thereto.

In particular, the coordinate transforming matrix 161 at least includes a first homogeneous matrix $H_R^E$ indicating a transforming relationship between the end-effector coordinate system EF and the robot coordinate system RF, a second homogeneous matrix $H_E^T$ indicating a transforming relationship between the tool coordinate system TF and the end-effector coordinate system EF, a third homogeneous matrix $H_R^T$ indicating a transforming relationship between the tool coordinates TF and the robot coordinate system RF, a fourth homogeneous matrix $H_R^A$ indicating a transforming relationship between the alignment device coordinate system AF and the robot coordinate system RF, and a fifth homogeneous matrix $H_T^A$ indicating a transforming relationship between the alignment device coordinate system AF and the tool coordinate system TF, etc. The above descriptions are only few exemplary embodiments of this disclosure, the storing unit 16 may be used to store all or part of the homogeneous matrixes mentioned above, but not limited to the above disclosure.

It should be mentioned that the flange 110 on the robotic arm 11 and the robotic arm 11 can be collectively regarded as one (can be integrally formed), so the above first homogeneous matrix can be directly obtained through robot kinematics, which is the basic information originally known by the processor 10. In other words, the processor 10 in this disclosure may directly obtain the first homogeneous matrix without any calculation or computation. In other embodiment, the first homogeneous matrix may be directly recorded in the processor 10 during the manufacture of the calibration apparatus 1, but not limited thereto.

In the embodiment of FIG. 1 and FIG. 2, the alignment device 13 includes the 2D visual extractor 15 for capturing 2D images 151 and the light blocking sensor 14 for obtaining the height information. However, once the movement information of the robotic arm 11 within the three-dimensional space can be obtained and the robotic arm 11 can be calibrated, the alignment device 13 of this disclosure is not limited only to the disclosure as shown in FIG. 1 and FIG. 2.

Figure 14:
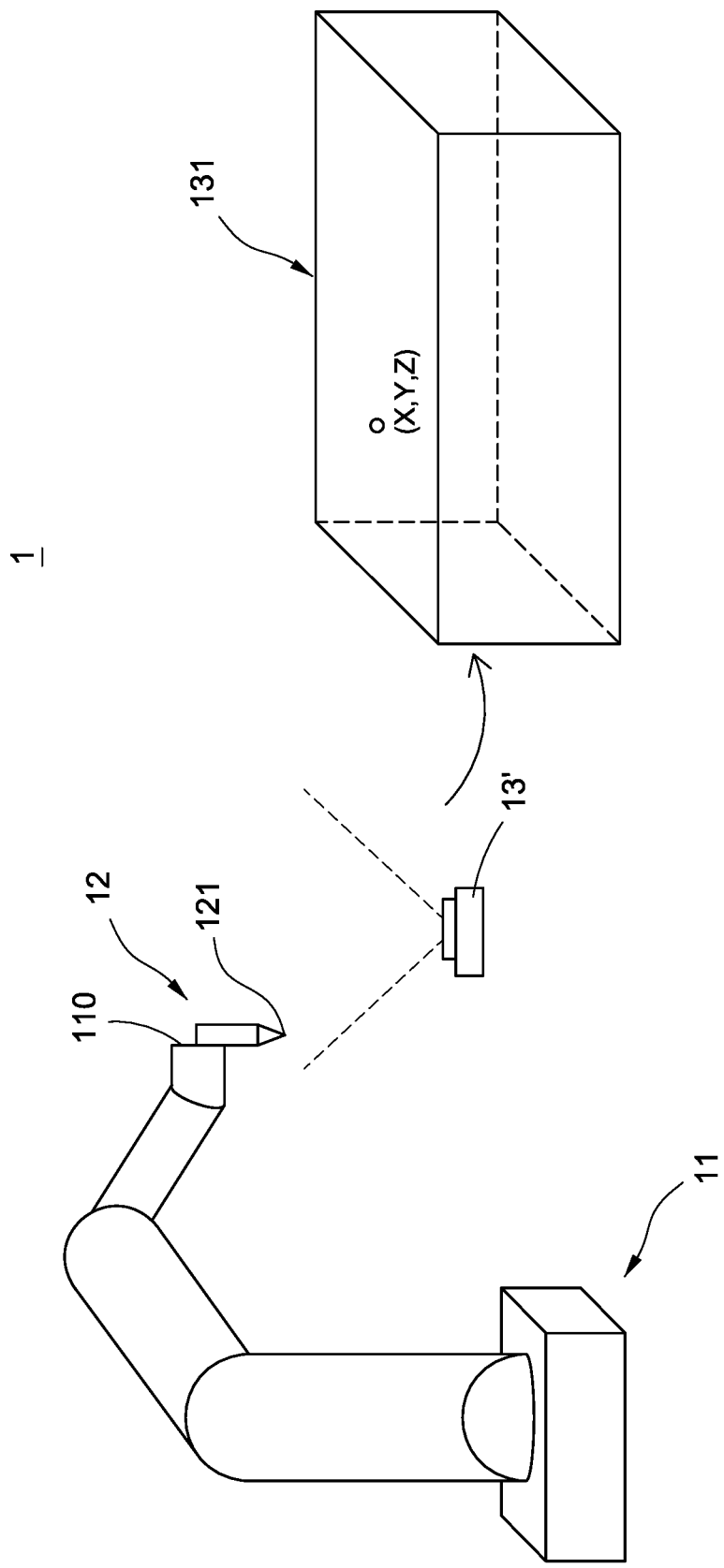
FIG. 14 is a schematic diagram of a calibration apparatus of a second embodiment according to this disclosure.

Please refer to FIG. 14, which is a schematic diagram of a calibration apparatus of a second embodiment according to this disclosure. In the embodiment as shown in FIG. 14, the calibration apparatus 1 includes a processor (not shown), the robotic arm 11, and another alignment device 13'. In this embodiment, the alignment device 13' is a 3D machine visual sensor.

In particular, the 3D machine visual sensor is a type of sensor which may directly capture a 3D image within a three-dimensional space 131. When the robotic arm 11 drives the tool 12 to move within the three-dimensional space 131, the alignment device 13' may directly capture a 3D image of the tool 12, and perform an image analysis to the 3D image, therefore the processor may obtain information of the tool 12, such as shape, gesture, position, tilted angle, etc. through the analyzed data obtained from the image analysis. Besides, after corresponding the analyzed data to the alignment device coordinate system AF used by the alignment device 13', the processor may directly obtain the coordinate position (X, Y, Z) of the TCP 121 within the three-dimensional space 131.

In other embodiment, the alignment device of this disclosure may have other forms, for example, a combination of a 2D image sensor and a depth sensor (such as Kinect published by Microsoft), or a sensor combination having structure light emitting function and structure light scanning function, but not limited thereto.

Figure 4:
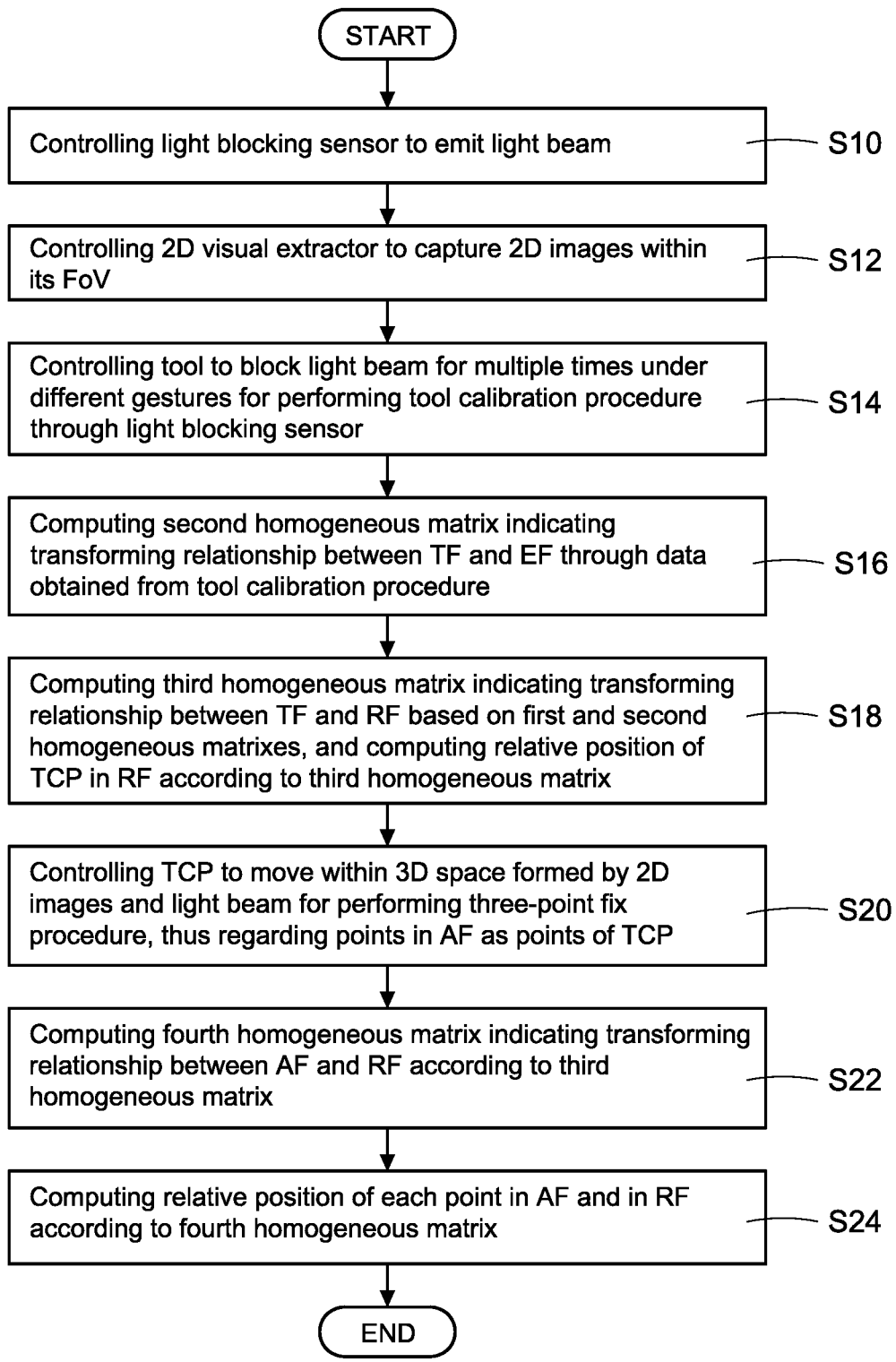
FIG. 4 is a flowchart of a coordinate system calibration method of a first embodiment according to this disclosure.

FIG. 4 is a flowchart of a coordinate system calibration method of a first embodiment according to this disclosure. FIG. 4 discloses specific implementing steps of the calibration method of this disclosure. The following descriptions are provided with FIG. 1, FIG. 3, and FIG. 4 for interpreting how the calibration apparatus 1 of this disclosure establishes the coordinate transforming matrix 161.

When establishing the coordinate transforming matrix 161, the calibration apparatus 1 uses the processor 10 to control the light blocking sensor 14 to emit the light beam 141 (step S10), and control the 2D visual extractor 15 to capture the 2D images 151 within its FoV (step S12). If the light beam 141 is visible light, the captured 2D images 151 at least include the image of the light beam 141, and a three-dimensional space is formed by the light beam 141 and the 2D images 151. More specifically, the processor 10 activates the alignment device 13 through the step S10 and the step S12.

After the alignment device 13 is activated, the processor 10 controls the tool 12 on the robotic arm 11 to move, and the tool 12 is controlled to block the light beam 141 for multiple times under different (multiple) gestures for performing a tool calibration procedure through the light blocking sensor 14 (step S14). After the tool calibration procedure is completed, the processor 10 may compute the second homogeneous matrix indicating the transforming relationship between the tool coordinate system TF and the end-effector coordinate system EF through the data obtained from the tool calibration procedure (step S16).

It is worth saying that, in the step S14, the processor 10 performs a tool dimension calibration procedure to the tool 12 through the light blocking sensor 14 of the alignment device 13 for obtaining a displacement amount of the TCP 121 with respect to the flange 110, and calculates a dimension of the tool 12 according to the displacement amount. Further, in the step S14, the processor 10 performs a tool direction calibration procedure to the tool 12 through the light blocking sensor 14 for obtaining a rotation amount of the TCP 121 with respect to the flange 110, and calculates a direction vector of the tool 12 according to the rotation amount (detail described below). In the step S16, the processor 10 may establish the second homogeneous matrix based on the displacement amount and the rotation amount.

Detail description of the mathematical structure of the homogeneous transforming matrix and the approach for establishing the homogeneous transforming matrix are omitted here for brevity.

After the step S16, the processor 10 may compute the third homogeneous matrix indicating the transforming relationship between the tool coordinate system TF and the robot coordinate system RF based on the first homogeneous matrix and the second homogeneous matrix, and computes a relative position of the TCP 121 in the robot coordinate system RF according to the transformation of the third homogeneous matrix (step S18).

After the step S18, the calibration apparatus 1 completes the calibrating action for the tool 12 (as well as the TCP 121). In this disclosure, the processor 10 may directly obtain the relative position of the TCP 121 in the robot coordinate system RF after the step S18, instead of a position deviation of the TCP 121 with respect to a tool pattern previously created. In comparison with the technical solution provided in the related arts, the calibration apparatus and the calibration method of this disclosure may provide better calibration effect.

After the step S18, the processor 10 may further control the tool 12 to move, and make the TCP 121 move within a three-dimensional space formed by the 2D images 151 and the light beam 141, and the processor 10 records the coordinate information of the TCP 121 on at least three positioning points in the three-dimensional space for performing a three-point fix procedure. By performing the three-point fix procedure, the processor 10 may regard the points in the alignment device coordinate system AF as the points of the TCP 121 (step S20).

Before establishing the fourth homogeneous matrix indicating the transforming relationship between the alignment device coordinate system AF and the robot coordinate system RF, the processor 10 has to establish the third homogeneous matrix indicating the transforming relationship between the tool coordinate system TF and the robot coordinate system RF and the fifth homogeneous matrix indicating the transforming relationship between the alignment device coordinate system AF and the tool coordinate system TF. More specifically, the transforming relationship may be depicted by the following formula:

$$H_R^A = H_R^E H_E^T H_T^A = H_R^T H_T^A$$

In the above formula, $H_R^A$ indicates the fourth homogeneous matrix, $H_R^E$ indicates the first homogeneous matrix, $H_T^E$ indicates the second homogeneous matrix, $H_T^A$ indicates the fifth homogeneous matrix, $H_R^T$ indicates the third homogeneous matrix (the third homogeneous matrix may be obtained based on the first homogeneous matrix and the second homogeneous matrix).

However, there is no fixed transforming relationship between the tool coordinate system TF and the alignment device coordinate system AF, so the above fifth homogeneous matrix may not be directly obtained. In order to solve the problem, the calibration apparatus 1 of this disclosure regards the points in the alignment device coordinate system AF as the point of the TCP 121 through performing the three-point fix procedure, so the processor 10 may directly compute the fourth homogeneous matrix indicating the transforming relationship between the alignment device coordinate system AF and the robot coordinate system RF according to the third homogeneous matrix (step S22). Therefore, the processor 10 may compute the relative position of each point in the alignment device coordinate system AF and in the robot coordinate system RF according to the fourth homogeneous matrix (step S24).

After the step S24, when the coordinates of any point in the alignment device coordinate system AF is obtained, the processor 10 may compute the relative position of this point in the robot coordinate system RF through the transformation of the fourth homogeneous matrix. By reference to such corresponding relationships, the calibration apparatus 1 of this disclosure may use one single alignment device 13 to perform alignment and calibration to multiple robotic arms (detail described below).

Figure 5:
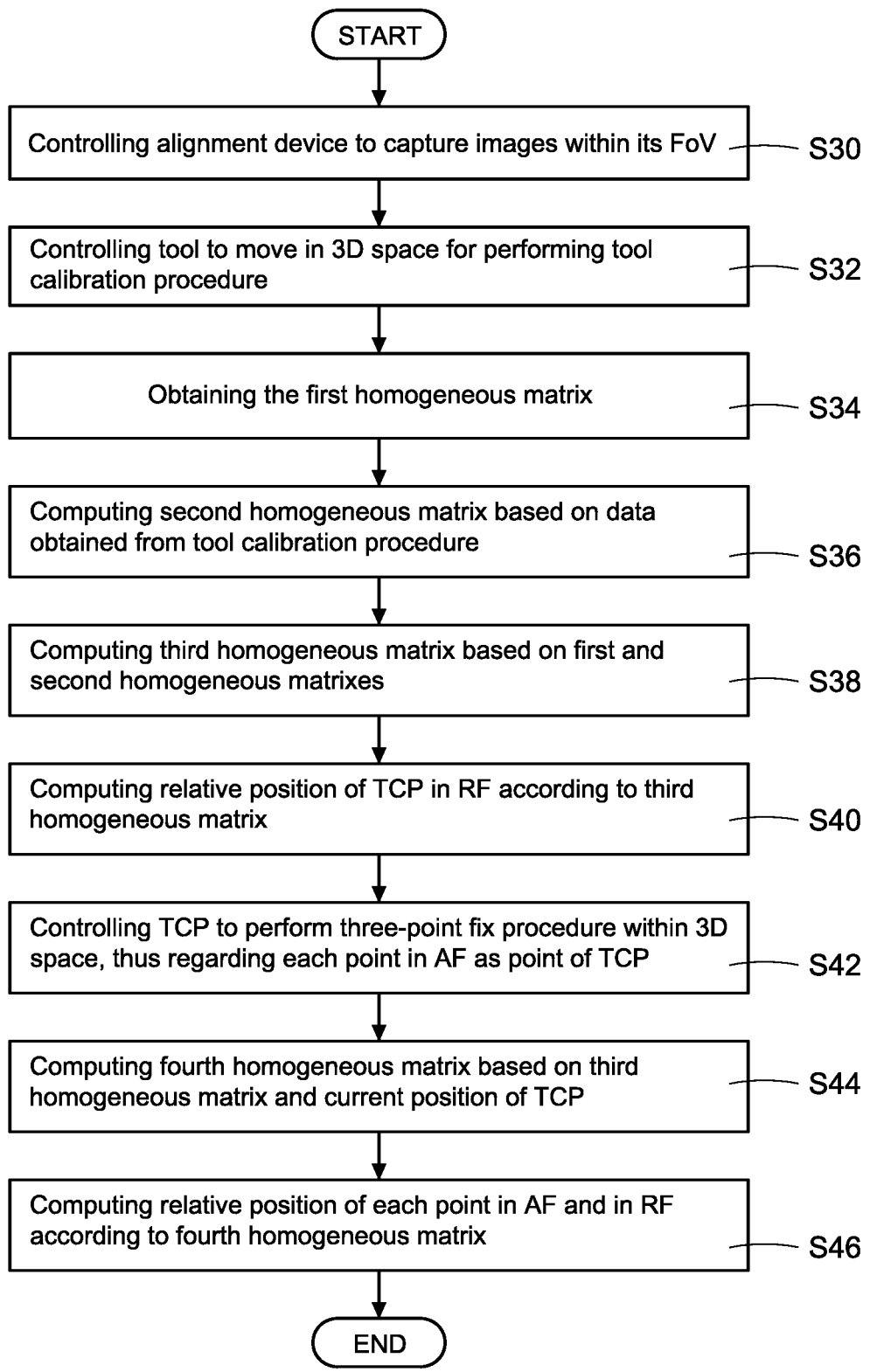
FIG. 5 is a flowchart of the coordinate system calibration method of a second embodiment according to this disclosure.

FIG. 5 is a flowchart of the coordinate system calibration method of a second embodiment according to this disclosure. FIG. 5 discloses another specific implementing steps of the calibration method of this disclosure, and these steps are used to illustrate how the calibration apparatus 1 of this disclosure establishes the coordinate transforming matrix 161 through another embodiment.

When establishing the coordinate transforming matrix 161, the calibration apparatus 1 may use the processor 10 to control the alignment device 13 (or the alignment device 13', here uses the alignment device 13 as an example) to capture the images within its FoV (step S30). In this disclosure, the FoV of the alignment device 13 is a three-dimensional space, such as a three-dimensional space formed by the light beam 141 and the 2D images 151, or a three-dimensional space defined by the 3D machine visual sensor.

After the alignment device 13 is activated (i.e., after the alignment device 13 starts to capture images), the processor 10 controls the tool 12 of the robotic arm 11 to move in the three-dimensional space under different gestures for performing a tool calibration procedure (step S32). After the step S32, the processor 10 may obtain the first homogeneous matrix (step S34), and compute the second homogeneous matrix based on the data obtained from the tool calibration procedure (step S36), and compute the third homogeneous matrix based on the first homogeneous matrix and the second homogeneous matrix (step S38). Next, the processor 10 may compute the relative position of the TCP 121 in the robot coordinate system RF according to the transformation of the third homogeneous matrix (step S40).

In particular, the detail description of the mathematical structure of the homogeneous transforming matrix and the approach for establishing the homogeneous transforming matrix are omitted here for brevity.

After the step S40, the processor 10 may control the tool 12 to move and make the TCP 121 to perform the three-point fix procedure within the three-dimensional space, so as to regard each point in the alignment device coordinate system AF as the point of the TCP 121 (step S42).

More specifically, the three-point fix procedure may make the processor 10 regard the points in the alignment device coordinate system AF as the points of the TCP 121, therefore, the processor 10 may directly compute the fourth homogeneous matrix indicating the transforming relationship between the alignment coordinate system AF and the robot coordinate system RF based on the third homogeneous matrix and the current position of the TCP 121 (step S44). As a result, the processor 10 may compute the relative position of each point in the alignment device coordinate system AF and in the robot coordinate system RF according to the fourth homogeneous matrix (step S46). After the step S46, when the coordinates of any point in the alignment device coordinate system AF are obtained, the processor 10 may obtain the relative position of this point in the robot coordinate system RF through the transformation of the fourth homogeneous matrix.

Figure 6:
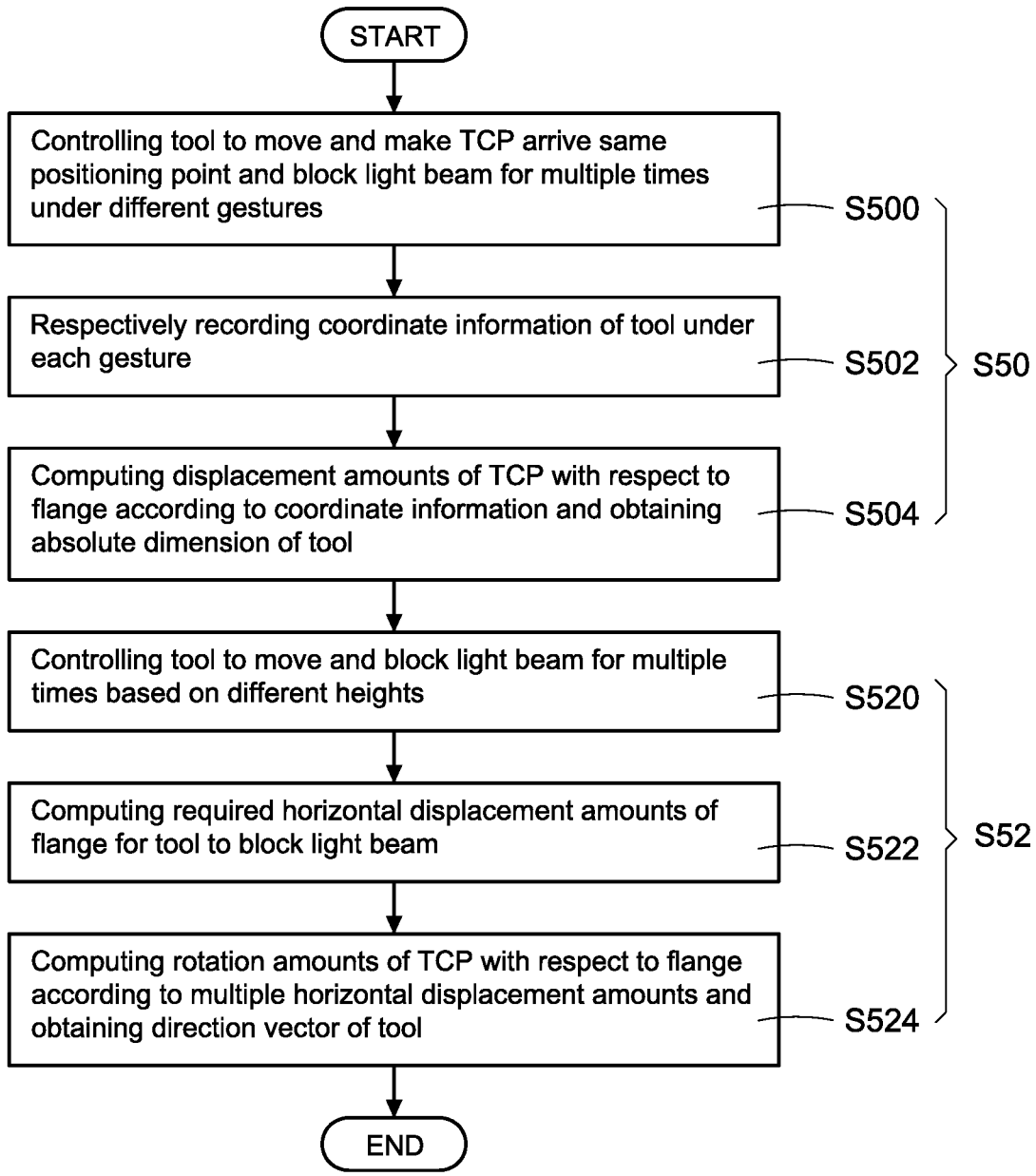
FIG. 6 is a flowchart of a tool calibration method of a first embodiment according to this disclosure.
Figure 7:
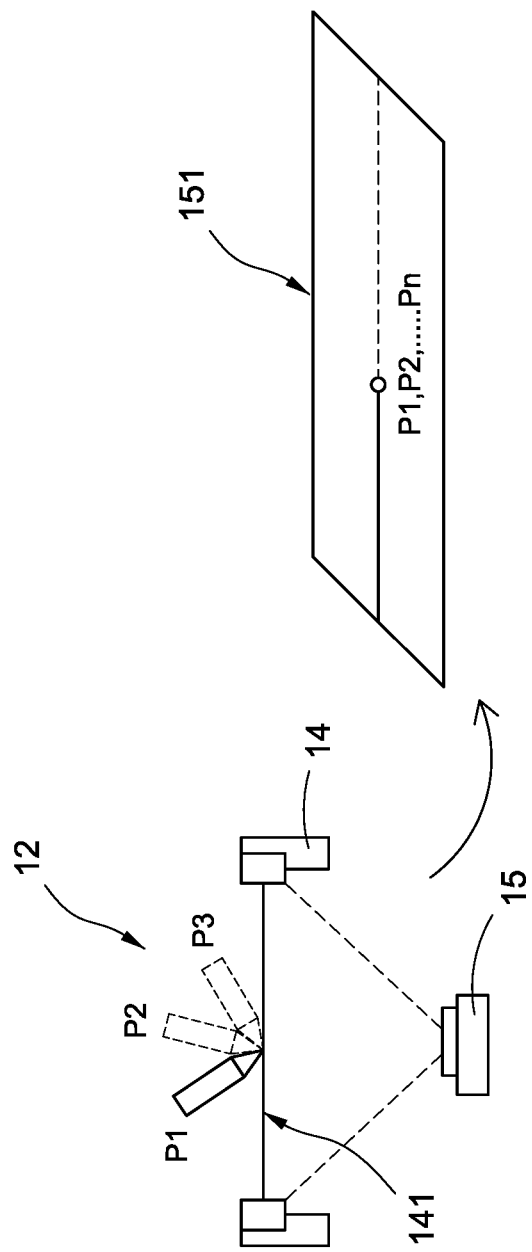
FIG. 7 is a schematic diagram showing a tool dimension calibration of a first embodiment according to this disclosure.
Figure 8:
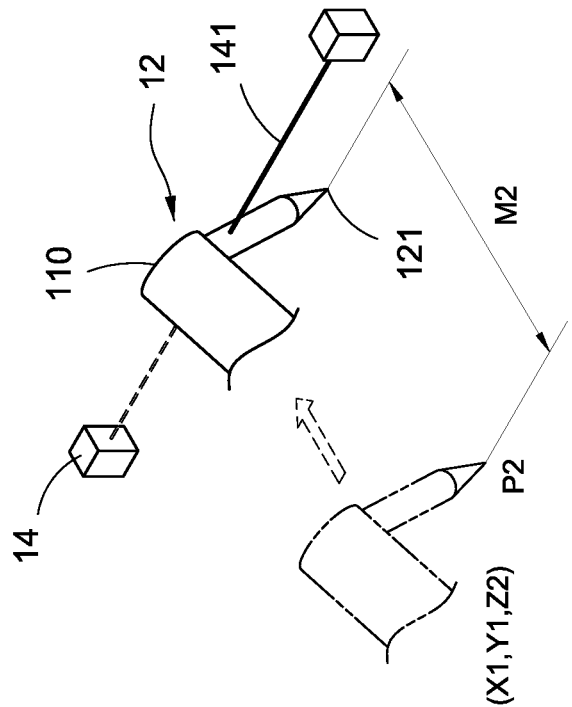
FIG. 8 is a schematic diagram showing a tool direction calibration of a first embodiment according to this disclosure.
Figure 8:
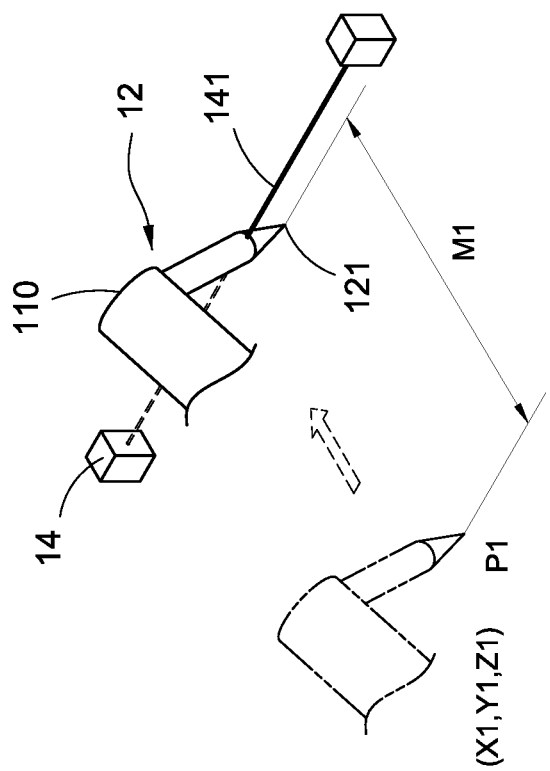

Please refer to FIG. 6, FIG. 7, and FIG. 8. FIG. 6 is a flowchart of a tool calibration method of a first embodiment according to this disclosure, FIG. 7 is a schematic diagram showing a tool dimension calibration of a first embodiment according to this disclosure, and FIG. 8 is a schematic diagram showing a tool direction calibration of a first embodiment according to this disclosure, wherein FIG. 6 is used to detailed describe the step S14 in FIG. 4.

Specifically, the tool calibration procedure performed in the step S14 of FIG. 4 includes a tool dimension calibration procedure (step S50) and a tool direction calibration procedure (step S52). By performing the tool dimension calibration procedure, the processor 10 may obtain a dimension of the tool 12 currently arranged on the robotic arm 11. By performing the tool direction calibration procedure, the processor 10 may obtain the current direction vector of the tool 12.

As shown in FIG. 6, when performing the tool dimension calibration procedure, the processor 10 controls the robotic arm 11 to drive the tool 12 to move and make the TCP 121 arrive at the same positioning point for multiple times under different gestures, wherein the TCP 121 may exactly block the light beam 141 when being positioned on the positioning point (step S500). As shown in FIG. 7, the processor 10 controls the tool 12 to make the TCP 121 arrive at a first positioning point P1 under a first gesture, to make the TCP 121 arrive a second positioning point P2 under a second gesture, . . . , and to make the TCP 121 arrive an Nth positioning point Pn under an Nth gesture. The above positioning points P1-Pn are indicating same point (i.e., having same coordinates in the tool coordinate system TF), and the TCP 121 may exactly block the light beam 141 on these positioning points (i.e., the processor 10 may obtain the Z-axis height of the TCP 121 through the blocking signal generated from the light blocking sensor 14).

Next, the processor 10 respectively records the coordinate information of the tool 12 under each of the gestures, such as the first gesture to the Nth gesture discussed above (step S502). Through referencing to the coordinate information, the processor 10 may compute displacement amounts of the TCP 121 with respect to the flange 110 of the robotic arm 11, so as to obtain the dimension of the entire tool 12 according to these displacement amounts (step S504).

After obtaining the dimension of the tool 12, the processor 10 completes the tool dimension calibration procedure.

When performing the tool direction calibration procedure, the processor 10 controls the robotic arm 11 to drive the tool 12 to move, and the tool 12 is controlled to move based on different heights and block the light beam 141 for multiple times at different heights (step S520). In particular, the step S520 is to continually change the height of the tool 12, and control the tool 12 to move for blocking the light beam 141 with different parts of the tool 12 (the height here indicates the Z-axis height of the flange 110 with respect to the robotic arm 11). Meanwhile, the processor 10 computes required horizontal displacement amounts of the flange 110 for the tool 12 to be able to block the light beam 141 (step S522).

In this disclosure, the processor 10 may change the height of the tool 12, change the tilted direction of the tool 12, and rotate the tool 12 for multiple times, and obtain multiple horizontal displacement amounts through the step S522. According to the multiple horizontal displacement amounts, the processor 10 may compute rotation amounts of the TCP 121 with respect to the flange 110, and obtain the direction vector of the tool 12 according to these rotation amounts (step S524).

As shown in FIG. 8, the tool 12 tilts towards a direction. When the flange 110 is positioned at a first height (i.e., the TCP 121 is positioned on a first positioning point P1), the flange 110 needs to move horizontally for a first displacement amount M1 from a starting position (X1, Y1, Z1) for the tool 12 to block the light beam 141. When the flange 110 is positioned at a second height (i.e., the TCP 121 is positioned on a second positioning point P2), the flange 110 needs to move horizontally for a second displacement amount M2 from a relative starting position (X1, Y1, Z2) for the tool 12 to block the light beam 141. By comparing the first displacement amount M1 with the second displacement amount M2, the processor 10 may compute a direction vector $\overrightarrow{P1P2}$ of the tool 12.

After obtaining the direction vector of the tool 12, the processor 10 completes the tool direction calibration procedure.

After the tool dimension calibration procedure in step S50 and the tool direction calibration procedure in step S52 are completed, the processor 10 may establish the second homogeneous matrix indicating the transforming relationship between the tool coordinate system TF and the end-effector coordinate system EF according to the data obtained from the aforementioned calibration procedure (such as the displacement amounts, the dimension, the rotation amount, the direction vector, etc.).

It should be mentioned that if the calibration apparatus 1 incorporates with the alignment device 13' as shown in FIG. 14, the calibration apparatus 1 may use the similar approach to perform the tool dimension calibration procedure and the tool direction calibration procedure of the tool calibration procedure, so as to obtain the dimension and the direction vector of the tool 12 arranged on the robotic arm 11.

Figure 9:
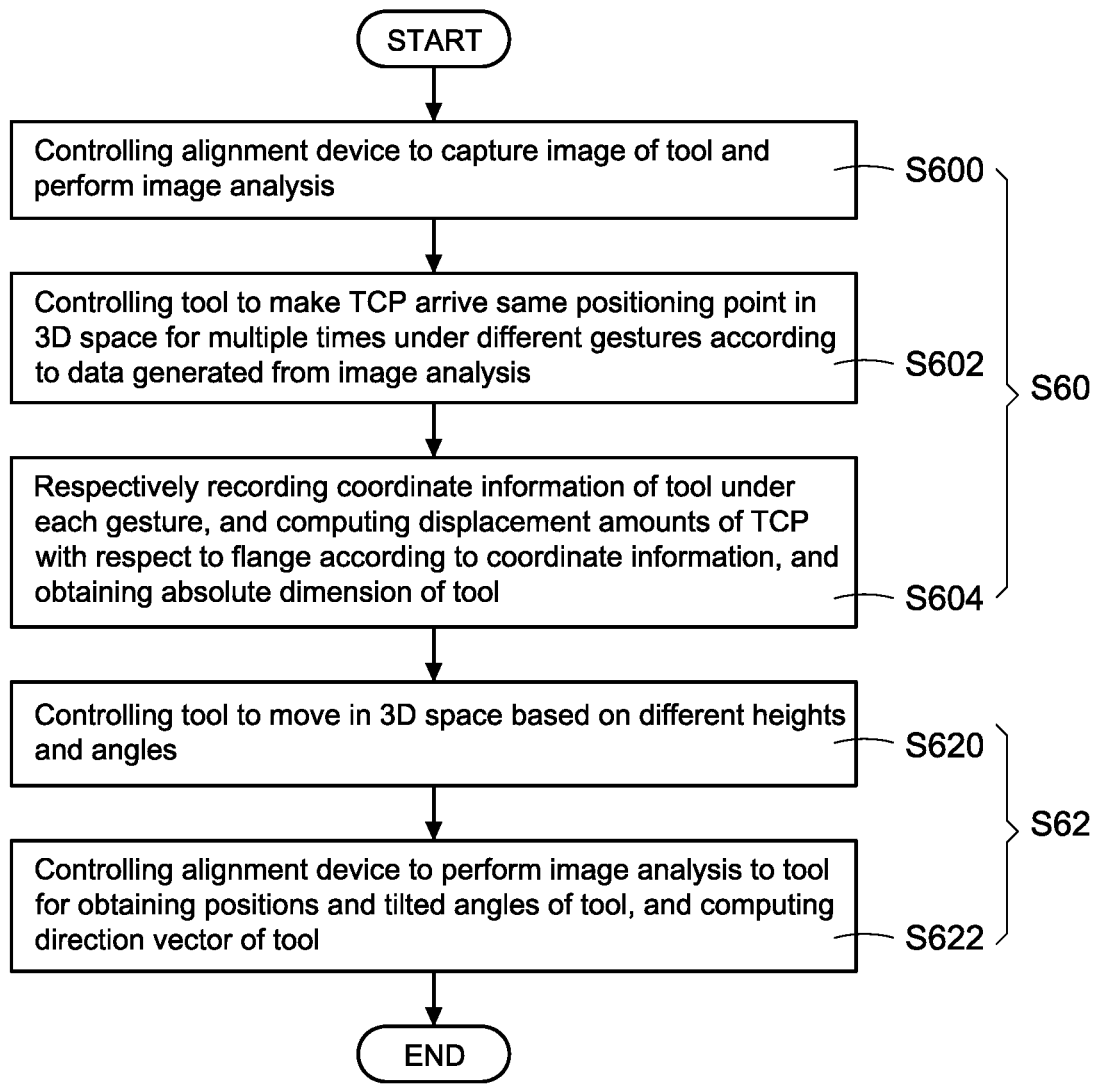
FIG. 9 is a flowchart of the tool calibration method of a second embodiment according to this disclosure.

Please refer to FIG. 9, which is a flowchart of the tool calibration method of a second embodiment according to this disclosure. In the embodiment of FIG. 9, when performing the tool dimension calibration procedure (step S60), the processor 10 controls the robotic arm 11 to move and make the tool 12 enter the FoV of the alignment device 13' (such as the three-dimensional space 131), and controls the alignment device 13' to capture the image of the tool 12 and to perform an image analysis to the captured images (step S600).

Next, the processor 10 controls the robotic arm 11 according to the data generated from the image analysis, so the tool 12 makes the TCP 121 arrive at the same positioning point in the three-dimensional space 131 for multiple times under different gestures (step S602). The approach for the tool 12 to make the TCP 121 arrive at the same positioning point in the three-dimensional space 131 under different gestures is similar to the approach disclosed above with respect to FIG. 7, the difference between the embodiment of FIG. 7 and the embodiment here is that, the alignment device 13' may directly obtain data of the tool 12, such as shape of the tool 12, gesture of the tool 12, coordinate information of the TCP 121, etc., according to the result of the image analysis, so blocking the light beam 141 is not needed.

Next, the processor 10 records coordinate information of the tool 12 under each gesture respectively, computes displacement amounts of the TCP 121 with respect to the flange 110 according to the coordinate information, and obtains a dimension of the entire tool 12 according to the displacement amounts (step S604). After obtaining the dimension of the tool 12, the processor 10 completes the tool dimension calibration procedure.

In the embodiment, when performing the tool direction calibration procedure (step S62), the processor 10 controls the tool 12 to move in the three-dimensional space 131 based on different heights and angles (step S620), controls the alignment device 13' to continually capture the images of the three-dimensional space 131, and performs an image analysis to the tool 12 in the captured images for obtaining the positions and the tilted angles of the tool 12, so as to compute the direction vector of the tool 12 (step S622).

In this embodiment, the processor 10 may change the height of the tool 12, the tilted direction of the tool 12, the tilted angle of the tool 12, and may rotate the tool 12, and may control the alignment device 13' to capture the images of the tool 12 for performing the image analysis, so as to compute the direction vector of the tool 12 directly through the data generated from the image analysis. In comparison with the embodiment of FIG. 6, the embodiment of FIG. 9 may quickly complete the tool direction calibration procedure of this disclosure.

After obtaining the direction vector of the tool 12, the processor 10 may complete the tool direction calibration procedure.

After the tool dimension calibration procedure in step S60 and the tool direction calibration procedure in step S62 are completed, the processor 10 may establish the second homogeneous matrix indicating the transforming relationship between the tool coordinate system TF and the end-effector coordinate system EF according to the data obtained from the aforementioned calibration procedure (such as the displacement amounts, the dimension, the direction vector, etc.).

Figure 10:
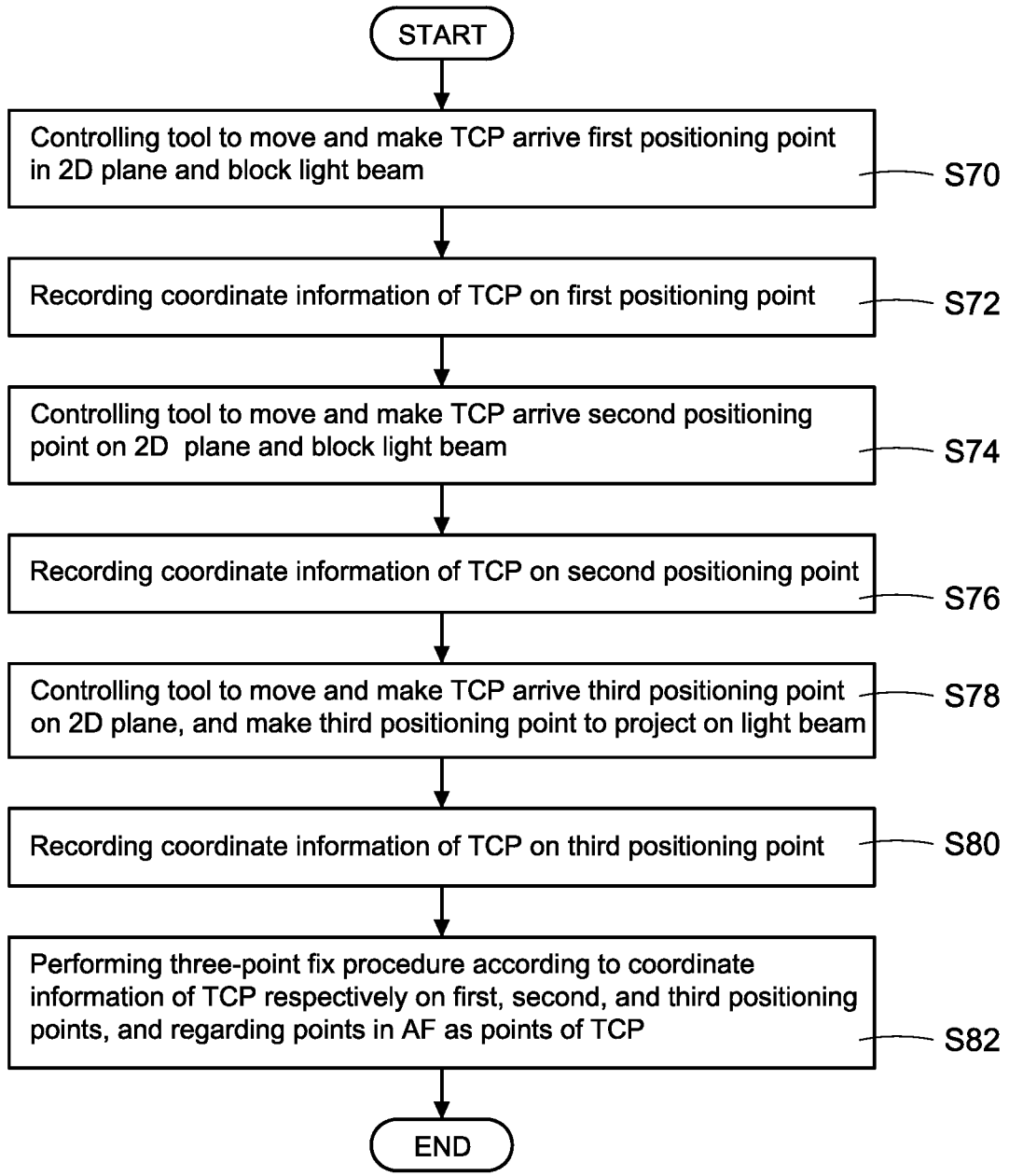
FIG. 10 is a flowchart of an alignment method of a first embodiment according to this disclosure.
Figure 11:
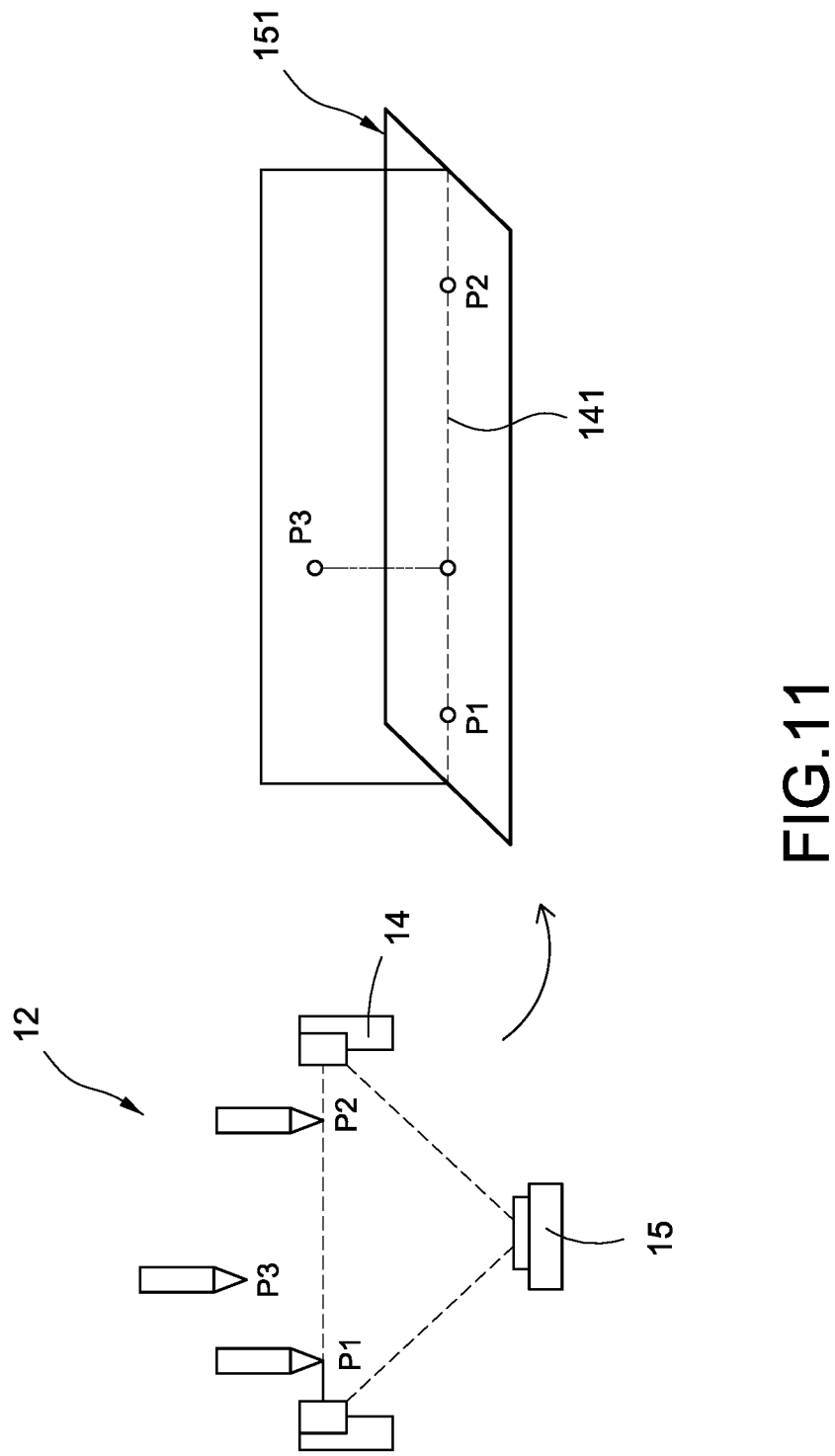
FIG. 11 is a schematic diagram showing a positioning operation of a first embodiment according to this disclosure.

Please refer to FIG. 10 and FIG. 11, wherein FIG. 10 is a flowchart of an alignment method of a first embodiment according to this disclosure, FIG. 11 is a schematic diagram showing a positioning operation of a first embodiment according to this disclosure. FIG. 10 is used to illustrate the step S20 in the FIG. 4 in more detail.

In the above step S20, the processor 10 controls the tool 12 to move, and makes the TCP 121 successively arrive at three positioning points in a two-dimensional plane, and performs the aforementioned three-point fix procedure according to the coordinate information of these three positioning points.

As shown in FIG. 10, when performing the three-point fix procedure, the processor 10 first controls the tool 12 to move and make the TCP 121 arrive a first positioning point P1 on a two-dimensional plane, and the TCP 121 blocks the light beam 141 on the first positioning point P1 (step S70). In the meantime, the processor 10 records the coordinate information of the TCP 121 on the first positioning point P1 (step S72). In particular, the coordinate information may be the coordinate information of the TCP 121 in the tool coordinate system TF, the coordinate information of the TCP 121 in the end-effector coordinate system EF, or the coordinate information of the TCP 121 in the robot coordinate system RF, but not limited thereto.

In this embodiment, the two-dimensional plane is located within the FoV of the 2D visual extractor 15.

Next, the processor 10 controls the tool 12 to move and make the TCP 121 arrive a second positioning point P2 on the same two-dimensional plane, and the TCP 121 blocks the light beam 141 on the second positioning point P2 (step S74). In the meantime, the processor 10 records the coordinate information of the TCP 121 on the second positioning point P2 (step S76).

As disclosed in FIG. 11, the first positioning point P1 and the second positioning point P2 are located on the same two-dimensional plane, and the TCP 121 may exactly block the light beam 141 either on the first positioning point P1 or on the second positioning point P2. In other words, the first positioning point P1 and the second positioning point P2 have the same Z-axis height and may form a straight line overlapping with the light beam 141 in the FoV of the 2D visual extractor 15.

After the step S76, the processor 10 controls the tool 12 to move and make the TCP 121 arrive a third positioning point P3 on the two-dimensional plane, wherein the third positioning point P3 may project on the light beam 141 (step S78). In the meantime, the processor 10 records the coordinate information of the TCP 121 on the third positioning point P3 (step S80).

As shown in FIG. 11, the Z-axis height of the third positioning point P3 is different from the Z-axis height of the first positioning point P1 and the second positioning point P2. In one of the exemplary embodiments, the Z-axis height of the third positioning point P3 may be higher than the Z-axis height of the first positioning point P1 and the second positioning point P2 (i.e., the light beam 141 may not be blocked by the tool 12 when the TCP 121 is positioned on the third positioning point P3). In another embodiment, the Z-axis height of the third positioning point P3 may be lower than the Z-axis height of the first positioning point P1 and the second positioning point P2 (i.e., the light beam 141 may be blocked by the tool 12 when the TCP 121 is positioned on the third positioning point P3). The third positioning point P3 may project upwards or downwards onto the straight line formed by the first positioning point P1 and the second positioning point P2, so a two-dimensional plane is formed by the third positioning point P3 and the straight line. Further, the two-dimensional plane is located within the three-dimensional space formed by the 2D image 151 and the light beam 141.

After the step S80, the processor 10 may perform the three-point fix procedure according to the coordinate information of the TCP 121 respectively on the first positioning point P1, the second positioning point P2, and the third positioning point P3, so the processor 10 may regard the points in the alignment device coordinate system AF as the points of the TCP 121 (step S82). Therefore, the processor 10 may compute the relative position of the points in the alignment device coordinate system AF and in the robot coordinate system RF.

The above embodiment of FIG. 10 and FIG. 11 is exemplified with the alignment device 13 having the light blocking sensor 14 and the 2D visual extractor 15, and illustrates the three-point fix procedure of this disclosure incorporated with the alignment device 13. It is worth saying that, when incorporating with the alignment device 13' as shown in FIG. 14, the calibration apparatus 1 may still perform the three-point fix procedure through the approach similar to the embodiment as discussed above with respect to FIG. 10 and FIG. 11. The difference between the embodiment using the alignment device 13 and the embodiment using the alignment device 13' is that, when the tool 12 moves within the three-dimensional space 131, the alignment device 13' may directly capture the images of the entire tool 12 and perform the image analysis, and may directly obtain the coordinate information of the TCP 121 respectively on the first positioning point P1, the second positioning point P2, and the third positioning point P3. Therefore, making the TCP 121 of the tool 12 block the light beam 141 emitted from the light blocking sensor 14 is not needed.

Figure 12A:
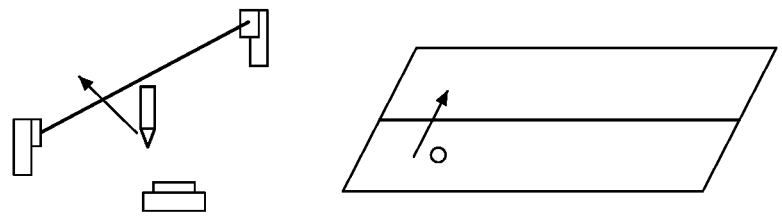
FIG. 12A is a first schematic diagram showing a light blocking operation of a first embodiment according to this disclosure.
Figure 12A:
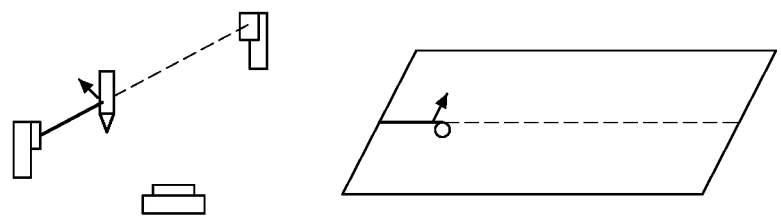
Figure 12A:
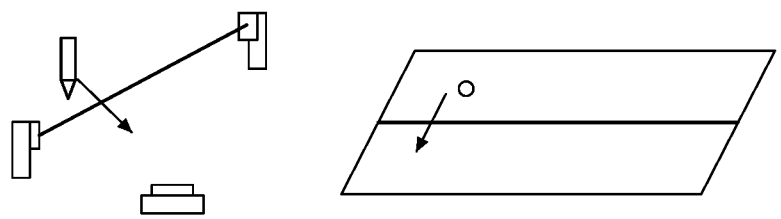
Figure 12A:
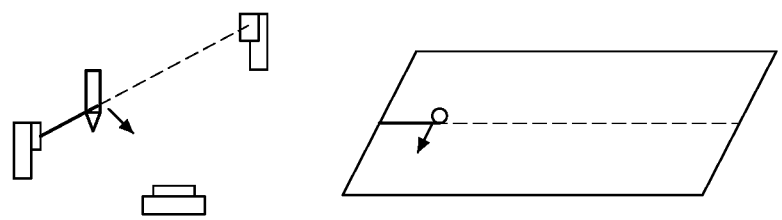
Figure 12B:
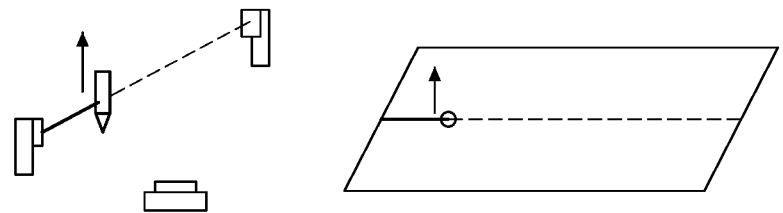
FIG. 12B is a second schematic diagram showing the light blocking operation of the first embodiment according to this disclosure.
Figure 12B:
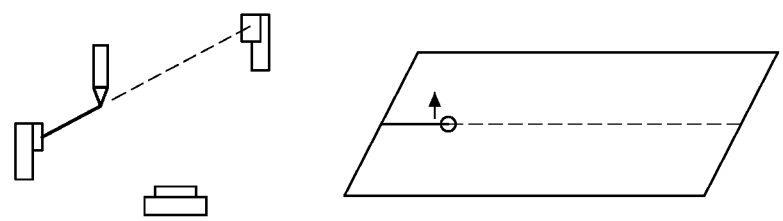
Figure 12B:
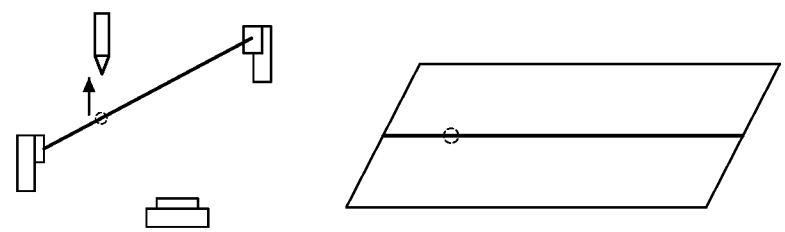

Please refer to FIG. 12A and FIG. 12B, wherein FIG. 12A is a first schematic diagram showing a light blocking operation of a first embodiment according to this disclosure, and FIG. 12B is a second schematic diagram showing the light blocking operation of the first embodiment according to this disclosure. FIG. 12A and FIG. 12B use decomposition actions to interpret how the processor 10 in this disclosure controls the tool 12 to move and make the TCP 121 block the light beam 141.

As the action (1) and the action (2) shown in FIG. 12A, the processor 10 may control the tool 12 to move leftwards from the right side of the light beam 141, and block the light beam 141 from the right side of the light beam 141 by any part of the tool 12. In the meantime, the processor 10 records a first X-axis coordinate and a first Y-axis coordinate of the tool 12. The X-axis coordinate and the Y-axis coordinate may be the coordinate information of the tool 12 in the tool coordinate system TF, in the end-effector coordinate system EF, or in the robot coordinate system RF, but not limited thereto.

As the action (3) and the action (4) shown in FIG. 12A, the processor 10 may control the tool 12 to move rightwards from the left side of the light beam 141, and block the light beam 141 from the left side of the light beam 141 by any part of the tool 12. In the meantime, the processor 10 records a second X-axis coordinate and a second Y-axis coordinate of the tool 12.

Next, as the action (5) shown in FIG. 12B, the processor 10 may compute a center X-axis coordinate and a center Y-axis coordinate of the tool 12. The center X-axis coordinate is the coordinate at which the tool 12 may block the light beam 141 according to the first X-axis coordinate and the second X-axis coordinate (such as to calculate an average value of the first X-axis coordinate and the second X-axis coordinate). The center Y-axis coordinate is the coordinate at which the tool 12 may block the light beam 141 according to the first Y-axis coordinate and the second Y-axis coordinate (such as to calculate an average value of the first Y-axis coordinate and the second Y-axis coordinate). Therefore, the processor 10 may control the tool 12 to move to a center position at which tool 12 may block the light beam 141 (i.e., a position of the center X-axis coordinate and the center Y-axis coordinate).

Next, as the action (6) shown in FIG. 12B, the processor 10 controls the tool 12 to move upwards from the center position to a critical position which may block the light beam 141 by the TCP 121, and the critical position may be recorded by the processor 10 as a preferred point for the TCP 121 to block the light beam 141 (such as the first positioning point P1 and the second positioning point P2 as discussed above).

As the action (7) shown in FIG. 12B, the processor 10 further controls the tool 12 to move upwards or downwards from the critical position, and projects the TCP 121 onto the light beam 141. Therefore, a projection point (such as the third positioning point P3 as discussed above) located on the two-dimensional plane the same as the light beam 141 may be obtained.

The above description is merely one of the point recording approaches of this disclosure, but not limited thereto. For example, if the light beam 141 is relatively thin, the processor 10 does not need to compute the center X-axis coordinate and the center Y-axis coordinate through the action (1) to the action (5) as discussed above.

As discussed above, the technical solution provided by this disclosure is to establish the fourth homogeneous matrix indicating the transforming relationship between the alignment device coordinate system AF used by the alignment device 13 and the robot coordinate system RF used by the robotic arm 11. If a working environment is built by one alignment device 13 incorporated with multiple robotic arms 11, and multiple fourth homogeneous matrixes are established by the processor 10 respectively for each of the robotic arms 11 with the alignment device 13, the processor 10 may obtain the transforming relationships among multiple robot coordinate systems respectively used by each of the robotic arms 11 through the multiple fourth homogeneous matrixes.

Figure 13:
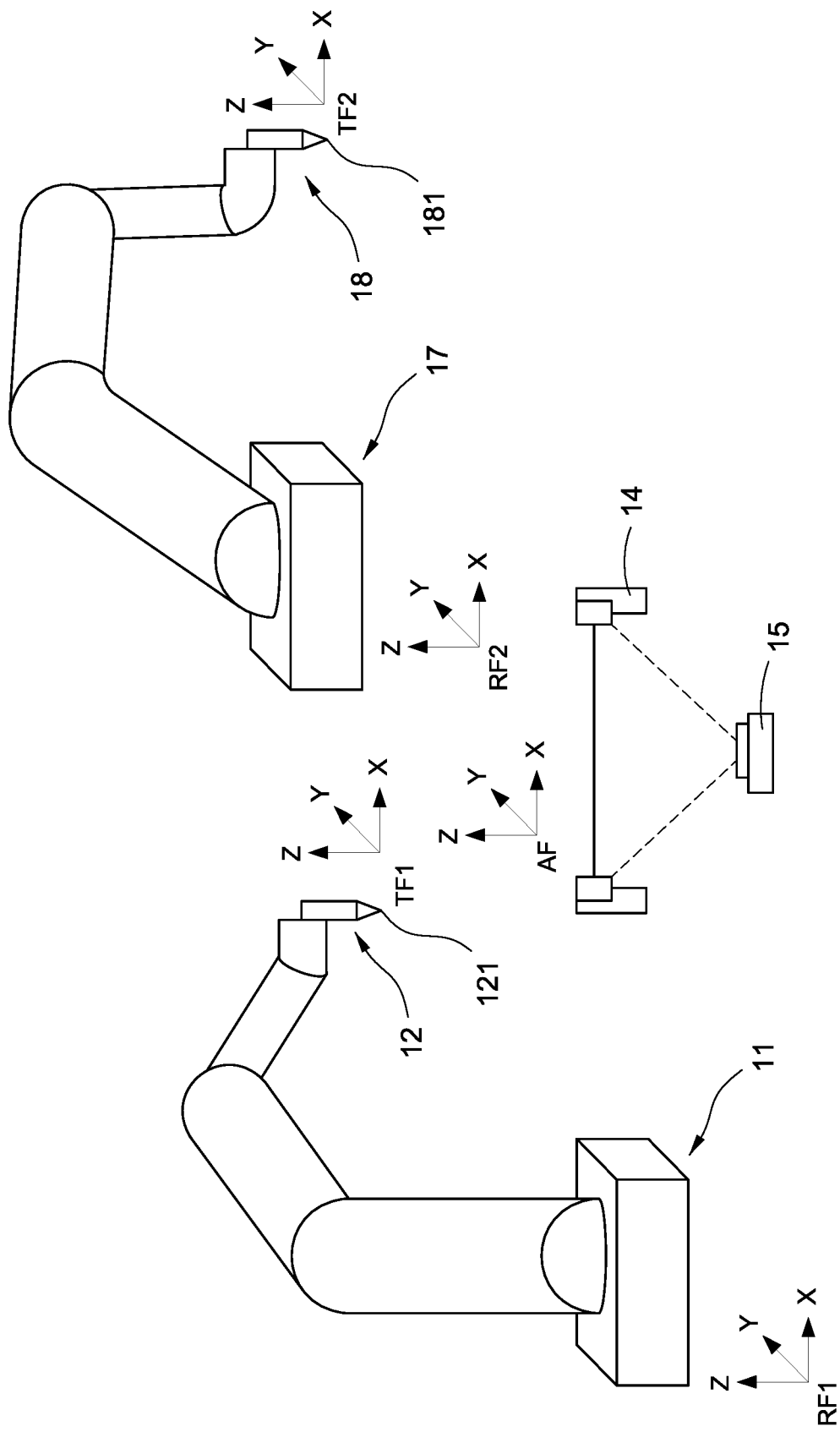
FIG. 13 is a schematic diagram showing the alignment of the coordinate systems of multiple robotic arms of a first embodiment according to this disclosure.

FIG. 13 is a schematic diagram showing the alignment of the coordinate systems of multiple robotic arms of a first embodiment according to this disclosure.

In the embodiment as shown in FIG. 13, the calibration apparatus 1 may include the robotic arm 11, the alignment device 13, and a second robotic arm 17. The robotic arm 11 and the alignment device 13 are the same as or similar to the above disclosure in FIG. 1, FIG. 2, and FIG. 3, and detail description is omitted here for brevity. The second robotic arm 17 may be a type of robotic arm same as or different from the robotic arm 11, and the second robotic arm 17 has a structure similar to the robotic arm 11, detail description is omitted here for brevity.

As shown in FIG. 13, the robotic arm 11 uses a first robot coordinate system RF1, the tool 12 arranged thereon uses a first tool coordinate system TF1. The alignment device 13 includes the aforementioned light blocking sensor 14 and 2D visual extractor 15, and the alignment device 13 uses an alignment device coordinate system AF. By using the calibration method discussed above, the processor 10 of the calibration apparatus 1 may establish a homogeneous matrix $H_{R1}^{A}$ indicating the transforming relationship between the alignment device coordinate system AF and the first robot coordinate system RF1.

The second robotic arm 17 uses a second robot coordinate system RF2, a tool 18 arranged thereon uses a second tool coordinate system TF2. Similarly, by using the calibration method discussed above, the processor 10 of the calibration apparatus 1 may establish another homogeneous matrix $H_{R2}^{A}$ indicating the transforming relationship between the alignment device coordinate system AF and the second robot coordinate system RF2.

If the points in the second robot coordinate system RF2 is being transformed into the points in the first robot coordinate system RF1, the processor 10 needs to establish a homogeneous matrix $H_{R1}^{R2}$ indicating the transforming relationship between the second robot coordinate system RF2 and the first robot coordinate system RF1. Based on the mathematical transformation, the homogeneous matrix $H_{R1}^{R2}$ is equal to $H_{R1}^{A} H_{A}^{R2}$, which is equal to $H_{R1}^{A}(H_{R2}^{A})^{T}$. In a conclusion, when the homogeneous matrix $H_{R1}^{A}$ and the homogeneous matrix $H_{R2}^{A}$ are known, the processor 10 may obtain the homogeneous matrix $H_{R1}^{R2}$ through mathematical computation.

Via using the homogeneous matrix $H_{R1}^{R2}$, the calibration apparatus 1 of this disclosure may easily relate each point (i.e., each coordinates) of each robotic arm 11 or 17 with one another, so it may operate the multiple robotic arms 11, 17 simultaneously based on same coordinate system. Therefore, the technical effect that improving the accuracy of the robotic arms and creating the working environment constituted of multiple robotic arms may be achieved.

Figure 15:
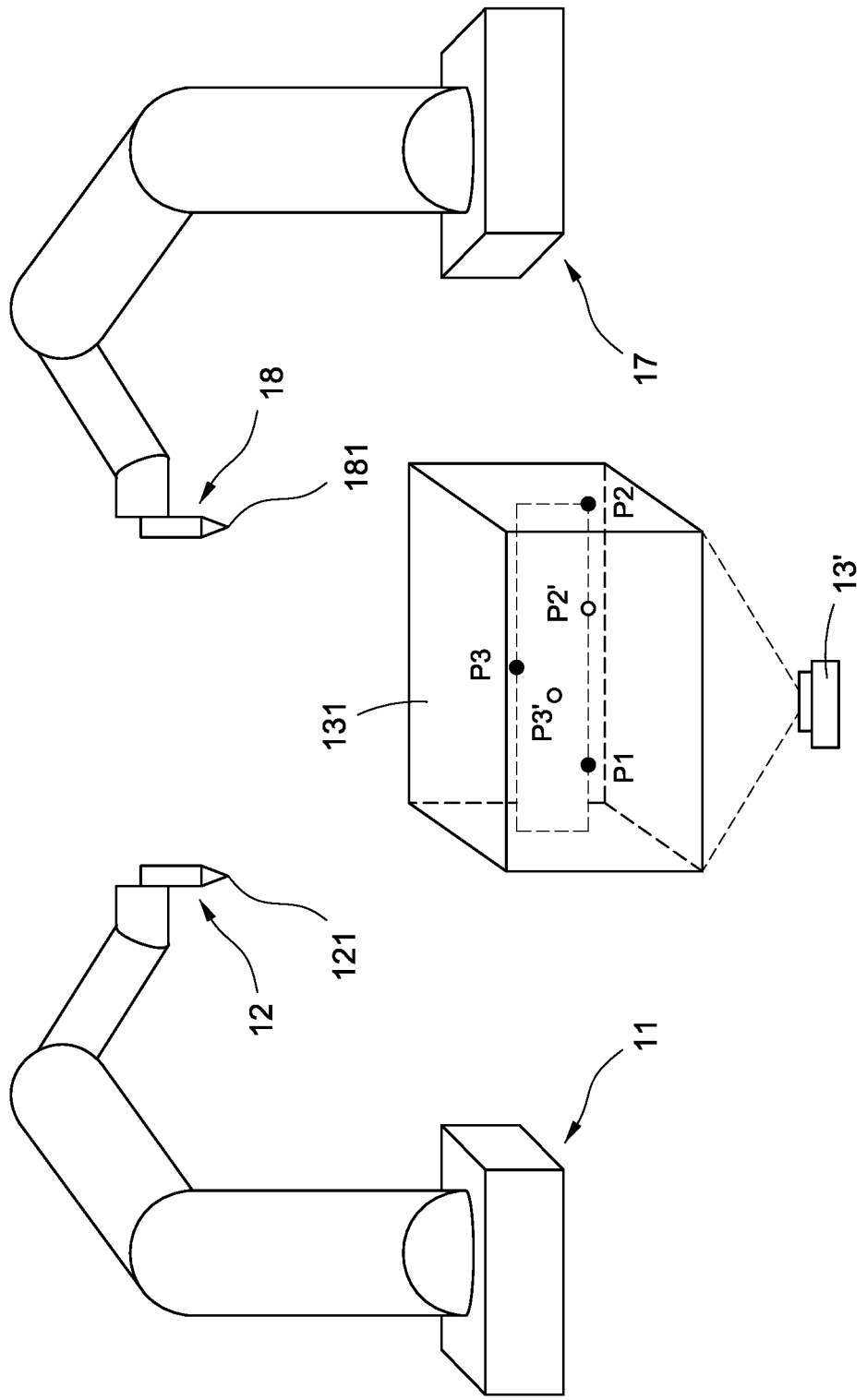
FIG. 15 is a schematic diagram showing the alignment of the coordinate systems of multiple robotic arms of a second embodiment according to this disclosure.

FIG. 15 is a schematic diagram showing the alignment of the coordinate systems of multiple robotic arms of a second embodiment according to this disclosure. If the calibration apparatus 1 incorporates with the alignment device 13' as shown in FIG. 14, the calibration apparatus 1 may establish the transforming relationship between the first robot coordinate system RF1 and the second robot coordinate system RF2 for the multiple robotic arms 11, 17 through performing the aforementioned three-point fix procedure.

In particular, when performing the three-point fix procedure (as the step S42 in FIG. 5), the processor 10 may control the robotic arm 11 to move, and make the TCP 121 of the tool 12 successively arrive a first positioning point P1, a second positioning point P2 located at the same straight line (such as a first straight line) with the first positioning point P1, and a third positioning point P3 located out of the first straight line and formed a two-dimensional plane (such as a first plane) with the first positioning point P1 and the second positioning point P2, and the processor 10 records the coordinate information of the TCP 121 respectively positioned on the first positioning point P1, the second positioning point P2, and the third positioning point P3 according to the result of the image analysis from the alignment device 13'.

Next, the processor 10 controls the second robotic arm 17 to move, and makes the TCP 181 of the tool 18 of the second robotic arm 17 arrive at the same first positioning point P1 within a three-dimensional space 131, makes the TCP 181 arrive an arbitrary second positioning point P2' located on the first straight line, and makes the TCP 181 arrive an arbitrary third positioning point P3' located on the first plane (wherein, the arbitrary third positioning point P3 is located out of the first straight line and on the same side as the third positioning point P3). Similarly, the processor 10 records the coordinate information of the TCP 181 respectively positioned on the first positioning point P1, the arbitrary second positioning point P2', and the arbitrary third positioning point P3' according to the result of the image analysis from the alignment device 13'.

As mentioned above, the processor 10 may regard the points in the alignment device coordinate system AF as the points of the TCP 121 or the TCP 181 through performing the three-point fix procedure, therefore, the processor 10 may establish the point transforming relationship among multiple robotic arms 11, 17 according to the above-mentioned procedures.

As the skilled person will appreciate, various changes and modifications can be made to the described embodiment. It is intended to include all such variations, modifications and equivalents which fall within the scope of this disclosure, as defined in the accompanying claims.

What is claimed is:

1. A calibration apparatus for a coordinate system of a robotic arm, the calibration apparatus comprising:
    an alignment device, capturing an image in a field of view (FoV), wherein the FoV is a three-dimensional space, and the alignment device uses an alignment device coordinate system, where the alignment device is immovable and the alignment device coordinate system is fixed;
    a robotic arm, one end of the robotic arm being arranged with a flange thereon, wherein the robotic arm uses a robot coordinate system, and the flange uses an end-effector coordinate system, and the robotic arm and the alignment device are arranged individually;
    a tool, one end of the tool being arranged on the flange, the other end of the tool comprising a tool center point (TCP), wherein the tool uses a tool coordinate system; and
    a processor, electrically connected with the alignment device and the robotic arm, recording a first homogeneous matrix indicating a transforming relationship between the end-effector coordinate system and the robot coordinate system, wherein the processor is configured to control the tool to move in the three-dimensional space generated by the alignment device under multiple gestures for performing a tool calibration procedure, and to compute a second homogeneous matrix indicating a transforming relationship between the tool coordinate system and the end-effector coordinate system according to data obtained from the tool calibration procedure;

wherein, the processor is configured to compute a third homogeneous matrix indicating a transforming relationship between the tool coordinate system and the robot coordinate system according to the first homogeneous matrix and the second homogeneous matrix, and to compute the relative position of the TCP in the robot coordinate system based on the third homogeneous matrix;

wherein, the processor is configured to control the TCP to perform a three-point fix procedure in the three-dimensional space for regarding points in the alignment device coordinate system as points of the TCP, the processor is configured to compute a fourth homogeneous matrix indicating a transforming relationship between the alignment device coordinate system and the robot coordinate system based on the third homogeneous matrix, and to compute the relative positions of points in the alignment device coordinate system and in the robot coordinate system according to the fourth homogeneous matrix.

2. The calibration apparatus in claim 1, wherein the alignment device is a 3D machine visual sensor.

3. The calibration apparatus in claim 2, wherein the tool calibration procedure comprises a tool dimension calibration procedure for obtaining a displacement amount of the TCP with respect to the flange and a tool direction calibration procedure for obtaining a rotation amount of the TCP with respect to the flange, and the processor is configured to establish the second homogeneous matrix based on the displacement amount and the rotation amount; wherein when the tool dimension calibration procedure is performed, the processor is configured to control the alignment device to perform an image analysis to the tool, control the tool to make the TCP arrive at the same positioning point in the three-dimensional space under multiple gestures based on data obtained from the image analysis, record coordinate information of the tool under each of the gestures, and compute a dimension of the tool according to the coordinate information; wherein when the tool direction calibration procedure is performed, the processor is configured to control the tool to move in the three-dimensional space based on multiple heights and angles, and perform the image analysis to the tool by the alignment device to obtain positions and tilted angles of the tool for computing a direction vector of the tool.

4. The calibration apparatus in claim 1, wherein the alignment device comprises a light blocking sensor and a 2D visual extractor, the light blocking sensor is configured to emit a light beam, the 2D visual extractor is configured to capture a 2D image within the FoV, the light beam is located within the FoV and forms the three-dimensional space with the 2D image, wherein the processor is configured to control the tool to block the light beam under multiple gestures for performing the tool calibration procedure through the light blocking sensor.

5. The calibration apparatus in claim 4, wherein the light blocking sensor is arranged on a horizontal plane, and the light beam is emitted on a fixed height.

6. The calibration apparatus in claim 4, wherein the tool calibration procedure comprises a tool dimension calibration procedure for obtaining a displacement amount of the TCP with respect to the flange and a tool direction calibration procedure for obtaining a rotation amount of the TCP with respect to the flange, and the processor is configured to establish the second homogeneous matrix based on the displacement amount and the rotation amount; wherein when the tool dimension calibration procedure is performed, the processor is configured to control the tool to make the TCP arrive at the same positioning point and block the light beam under multiple gestures, record coordinate information of the tool under each of the gestures respectively, and compute a dimension of the tool according to the coordinate information; wherein when the tool direction calibration procedure is performed, the processor is configured to control the tool to move and block the light beam based on multiple heights, compute a horizontal displacement amount of the flange for the tool to block the light beam upon each height, and compute a direction vector of the tool according to the multiple horizontal displacement amounts.

7. The calibration apparatus in claim 4, wherein when the three-point fix procedure is performed, the processor is configured to control the tool to move and make the TCP successively arrive at three positioning points on a two-dimensional plane in the three-dimensional space, and perform the three-point fix procedure according to the coordinate information of three positioning points.

8. The calibration apparatus in claim 7, wherein the processor is configured to execute the following actions to implement the three-point fix procedure:
   controlling the TCP to arrive at a first positioning point on the two-dimensional plane and block the light beam;
   recording coordinate information of the TCP on the first positioning point;
   controlling the TCP to arrive at a second positioning point on the two-dimensional plane and block the light beam, wherein a height of the second positioning point is the same with a height of the first positioning point;
   recording coordinate information of the TCP on the second positioning point;
   controlling the TCP to arrive at a third positioning point on the two-dimensional plane, wherein a height of the third positioning point is different from the height of the first positioning point and the height of the second positioning point;
   recording coordinate information of the TCP on the third positioning point; and
   performing the three-point fix procedure according to the coordinate information of the first positioning point, the second positioning point, and the third positioning point.

9. A calibration method for a coordinate system of a robotic arm, incorporated with a calibration apparatus comprising an alignment device, a robotic arm, a tool arranged on a flange on one end of the robotic arm and comprising a tool center point (TCP), and a processor electrically connected with the alignment device and the robotic arm, wherein the robotic arm uses a robot coordinate system, the flange uses an end-effector coordinate system, the tool uses a tool coordinate system, the alignment device uses an alignment device coordinate system, and the robotic arm and the alignment device are arranged individually, the calibration method comprising:
   a) controlling the alignment device to capture an image in a Field of view (FoV), wherein the FoV is a three-dimensional space, the alignment device is immovable, and the alignment device coordinate system is fixed;
   b) controlling the tool, by the processor, to move in the three-dimensional space generated by the alignment device under multiple gestures for performing a tool calibration procedure, wherein the processor records a first homogeneous matrix indicating a transforming relationship between the end-effector coordinate system and the robot coordinate system;

c) computing a second homogeneous matrix indicating a transforming relationship between the tool coordinate system and the end-effector coordinate system based on data obtained from the tool calibration procedure;

d) computing a third homogeneous matrix indicating a transforming relationship between the tool coordinate system and the robot coordinate system based on the first homogeneous matrix and the second homogeneous matrix, and computing the relative position of the TCP in the robot coordinate system according to the third homogeneous matrix;

e) controlling the TCP, by the processor, to perform a three-point fix procedure in the three-dimensional space for regarding points in the alignment device coordinate system as points of the TCP;

f) computing a fourth homogeneous matrix indicating a transforming relationship between the alignment device coordinate system and the robot coordinate system based on the third homogeneous matrix after the step e); and g) computing relative positions of points in the alignment device coordinate system and in the robot coordinate system according to the fourth homogeneous matrix.

10. The calibration method in claim 9, wherein the step b) comprises performing a tool dimension calibration procedure to the tool for obtaining a displacement amount of the TCP with respect to the flange, and performing a tool direction calibration procedure to the tool for obtaining a rotation amount of the TCP with respect to the flange, and terminating the tool calibration procedure according to the displacement amount and the rotation amount, wherein the step c) comprises establishing the second homogeneous matrix based on the displacement amount and the rotation amount.

11. The calibration method in claim 10, wherein the alignment device is a 3D machine visual sensor, and the step b) further comprises:

b11) controlling the alignment device to perform an image analysis to the tool;

b12) controlling the tool to make the TCP arrive at the same positioning point in the three-dimensional space under multiple gestures based on data obtained from the image analysis;

b13) recording coordinate information of the tool under each of the gestures, and computing the displacement amount and obtaining a dimension of the tool according to the coordinate information;

b14) controlling the tool, by the processor, to move in the three-dimensional space based on multiple heights and angles; and b15) performing the image analysis to the tool by the alignment device to obtain positions and tilted angles of the tool for computing a direction vector of the tool.

12. The calibration method in claim 9, wherein the alignment device comprises a light blocking sensor and a 2D visual extractor;

wherein the step a) comprises controlling the light blocking sensor to emit a light beam, and controlling the 2D visual extractor to capture a 2D image in the FoV, wherein the light beam is located within the FoV and forms the three-dimensional space with the 2D image;

wherein the step b) comprises controlling the tool to block the light beam under multiple gestures for performing the tool calibration procedure through the light blocking sensor.

13. The calibration method in claim 12, wherein the step b) comprises:

b21) controlling the tool, by the processor, to make the TCP arrive at the same positioning point and block the light beam under multiple gestures;

b22) recording coordinate information of the tool under each of the gestures respectively;

b23) computing the displacement amount and obtaining an absolute dimension of the tool according to the coordinate information;

b24) controlling the tool, by the processor, to move and block the light beam based on multiple heights;

b25) computing a horizontal displacement amount of the flange for the tool to block the light beam upon each height respectively; and b26) computing the rotation amount and obtaining a direction vector of the tool according to the horizontal displacement amounts.

14. The calibration method in claim 12, wherein the step e) comprises controlling the tool to move and make the TCP successively arrive at three positioning points on a two-dimensional plane in the three-dimensional space, and performing the three-point fix procedure according to the coordinates of the three positioning points.

15. The calibration method in claim 14, wherein the step e) comprises:

e1) controlling the TCP to arrive at a first positioning point on the two-dimensional plane and block the light beam;

e2) recording coordinate information of the TCP on the first positioning point;

e3) controlling the TCP to arrive at a second positioning point on the two-dimensional plane and block the light beam, wherein a height of the second positioning point is the same with a height of the first positioning point;

e4) recording coordinate information of the TCP on the second positioning point;

e5) controlling the TCP to arrive at a third positioning point on the two-dimensional plane, wherein a height of the third positioning point is different from the height of the first positioning point and the height of the second positioning point;

e6) recording coordinate information of the TCP on the third positioning point; and e7) performing the three-point fix procedure according to the coordinate information of the first positioning point, the second positioning point, and the third positioning point.

* * * * *